US012577882B2

(12) United States Patent
Ganiger et al.

(10) Patent No.: US 12,577,882 B2
(45) Date of Patent: Mar. 17, 2026

(54) COMPLIANT SHROUD DESIGNS WITH VARIABLE STIFFNESS

(71) Applicant: General Electric Company, Evendale, OH (US)

(72) Inventors: Ravindra Shankar Ganiger, Bengaluru (IN); Praveen Sharma, Bengaluru (IN); Jeffrey D. Carnes, Framingham, MA (US); Herbert Chidsey Roberts, Middletown, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/047,278

(22) Filed: Feb. 6, 2025

(65) Prior Publication Data

US 2025/0207505 A1 Jun. 26, 2025

Related U.S. Application Data

(63) Continuation of application No. 18/463,970, filed on Sep. 8, 2023, now Pat. No. 12,221,892, which is a (Continued)

(51) Int. Cl.
*F01D 11/14* (2006.01)
*F01D 11/12* (2006.01)

(52) U.S. Cl.
CPC ............ *F01D 11/127* (2013.01); *F01D 11/14* (2013.01); *F05D 2240/11* (2013.01); (Continued)

(58) Field of Classification Search
CPC ........ F01D 11/08; F01D 11/127; F01D 11/14; F01D 11/16; F05D 2240/11; (Continued)

(56) References Cited

U.S. PATENT DOCUMENTS 5,344,284 A 9/1994 Delvaux et al.
6,042,334 A 3/2000 Schilling
(Continued)

FOREIGN PATENT DOCUMENTS

CN 106437883 A 2/2017
CN 110199090 A 9/2019
(Continued)

OTHER PUBLICATIONS

United States Patent and Trademark Office, "Requirement for Restriction / Election," issued in connection with U.S. Appl. No. 17/343,454, dated Dec. 15, 2021, 7 Pages.
(Continued)

*Primary Examiner* — Courtney D Heinle
*Assistant Examiner* — Danielle M. Christensen
(74) *Attorney, Agent, or Firm* — Hanley, Flight & Zimmerman LLC

(57) ABSTRACT

Methods, apparatus, systems and articles of manufacture are disclosed. A shroud assembly of a gas turbine engine includes: a first shroud arm having a first end and a second end, the first end to couple to an outer wall and the second end to couple to a first shroud pad, and a second shroud arm having a first end and a second end, the first end to couple to the outer wall and the second end to couple to a second shroud pad, at least one of the first shroud pad or the second shroud pad to move radially outward toward the outer wall in response to a rotor blade contacting the at least one of the first shroud pad or the second shroud pad.

20 Claims, 14 Drawing Sheets

Related U.S. Application Data continuation of application No. 17/343,454, filed on Jun. 9, 2021, now Pat. No. 11,773,741.

(52) U.S. Cl.
CPC .... *F05D 2250/183* (2013.01); *F05D 2260/38* (2013.01); *F05D 2270/114* (2013.01); *F05D 2270/42* (2013.01)

(58) Field of Classification Search
CPC ............. F05D 2240/53; F05D 2240/59; F05D 2250/183; F05D 2260/38; F05D 2270/114; F05D 2270/42; F05D 2270/44
See application file for complete search history.

(56) References Cited

U.S. PATENT DOCUMENTS

| | | | | |
|---|---|---|---|---|
| 7,189,057 | B2 * | 3/2007 | Lee | F01D 11/16 415/128 |
| 7,435,049 | B2 | 10/2008 | Ghasripoor et al. | |
| 7,735,833 | B2 | 6/2010 | Braun et al. | |
| 8,628,092 | B2 * | 1/2014 | Deo | F01D 11/12 277/412 |
| 8,944,756 | B2 | 2/2015 | Lagueux | |
| 9,359,908 | B2 | 6/2016 | Bidkar et al. | |
| 9,945,243 | B2 | 4/2018 | O'Leary | |
| 10,533,446 | B2 | 1/2020 | Barak et al. | |
| 10,822,972 | B2 | 11/2020 | Mukherjee et al. | |
| 11,773,741 | B2 | 10/2023 | Ganiger et al. | |
| 12,221,892 | B2 | 2/2025 | Ganiger et al. | |
| 2004/0115043 | A1 | 6/2004 | Lee et al. | |
| 2005/0220610 | A1 | 10/2005 | Ghasripoor et al. | |
| 2006/0067815 | A1 | 3/2006 | Ghasripoor et al. | |
| 2009/0053554 | A1 | 2/2009 | Strock et al. | |
| 2015/0285152 | A1 | 10/2015 | Hayford et al. | |
| 2017/0159463 | A1 | 6/2017 | Mukherjee et al. | |
| 2018/0209274 | A1 | 7/2018 | Zatorski et al. | |
| 2018/0347465 | A1 | 12/2018 | Baumann et al. | |
| 2020/0165928 | A1 | 5/2020 | McCaffrey et al. | |

FOREIGN PATENT DOCUMENTS

| | | | |
|---|---|---|---|
| CN | 112554959 | A | 3/2021 |
| DE | 1475876 | A1 | 1/1970 |
| EP | 0875224 | A1 | 11/1998 |
| EP | 0980963 | A2 | 2/2000 |
| EP | 1408200 | A2 | 4/2004 |
| EP | 1408200 | B1 | 4/2007 |
| EP | 2875224 | A1 | 5/2015 |
| EP | 2875224 | B1 | 1/2019 |
| GB | 1565018 | A | 4/1980 |
| JP | H0925804 | A | 1/1997 |
| WO | 2008155163 | A1 | 12/2008 |

OTHER PUBLICATIONS

United States Patent and Trademark Office, "Advisory Action," issued in connection with U.S. Appl. No. 17/343,454, dated Jan. 4, 2022, 3 Pages.
United States Patent and Trademark Office, "Non-Final Office Action", issued in connection with U.S. Appl. No. 17/343,454, dated Mar. 31, 2022, 14 pages.
United States Patent and Trademark Office, "Final Office Action," issued in connection with U.S. Appl. No. 17/343,454, dated Oct. 3, 2022, 13 pages.
United States Patent and Trademark Office, "Non-Final Office Action", issued in connection with U.S. Appl. No. 17/343,454, on Jan. 26, 2023, 11 pages.
United States Patent and Trademark Office, "Notice of Allowance and Fee(s) Due," issued in connection with U.S. Appl. No. 17/343,454, dated May 22, 2023, 11 pages.
United States Patent and Trademark Office, "Non-Final Office Action," issued in connection with U.S. Appl. No. 18/463,970, dated May 9, 2024, 9 pages.
United States Patent and Trademark Office, "Notice of Allowance and Fee(s) Due", issued in connection with U.S. Appl. No. 18/463,970, on Oct. 1, 2024, 10 pages.
The State Intellectual Property of People's Republic of China, "First OfficeSearch," issued in connection with Chinese patent Application No. 202210647592.0, datedpages. [English Translation Included].
The State Intellectual Property of People's Republic of China, "Second Office Action," issued in connection with Chinese patent Application No. 202210647592.0, dated Jul. 29, 2025, 17 pages. [English Translation Included].

* cited by examiner

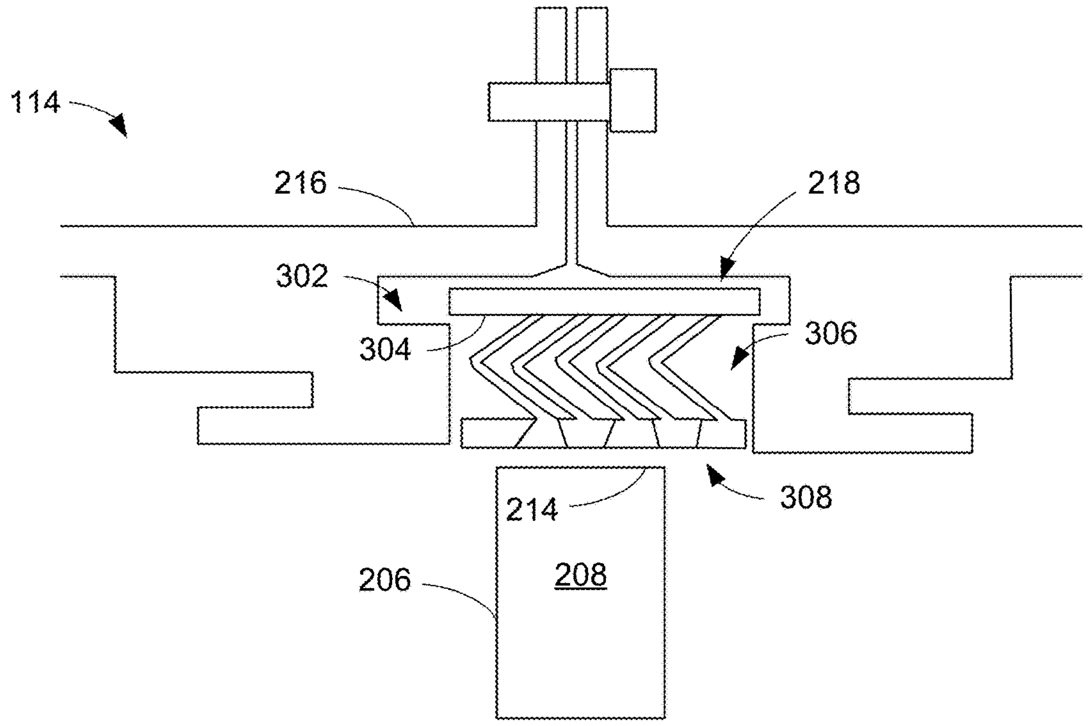
FIG. 3
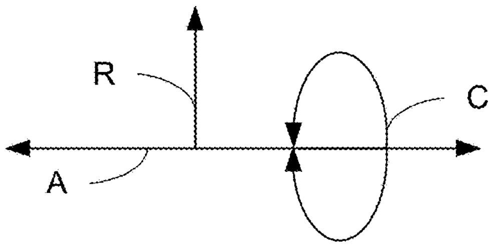

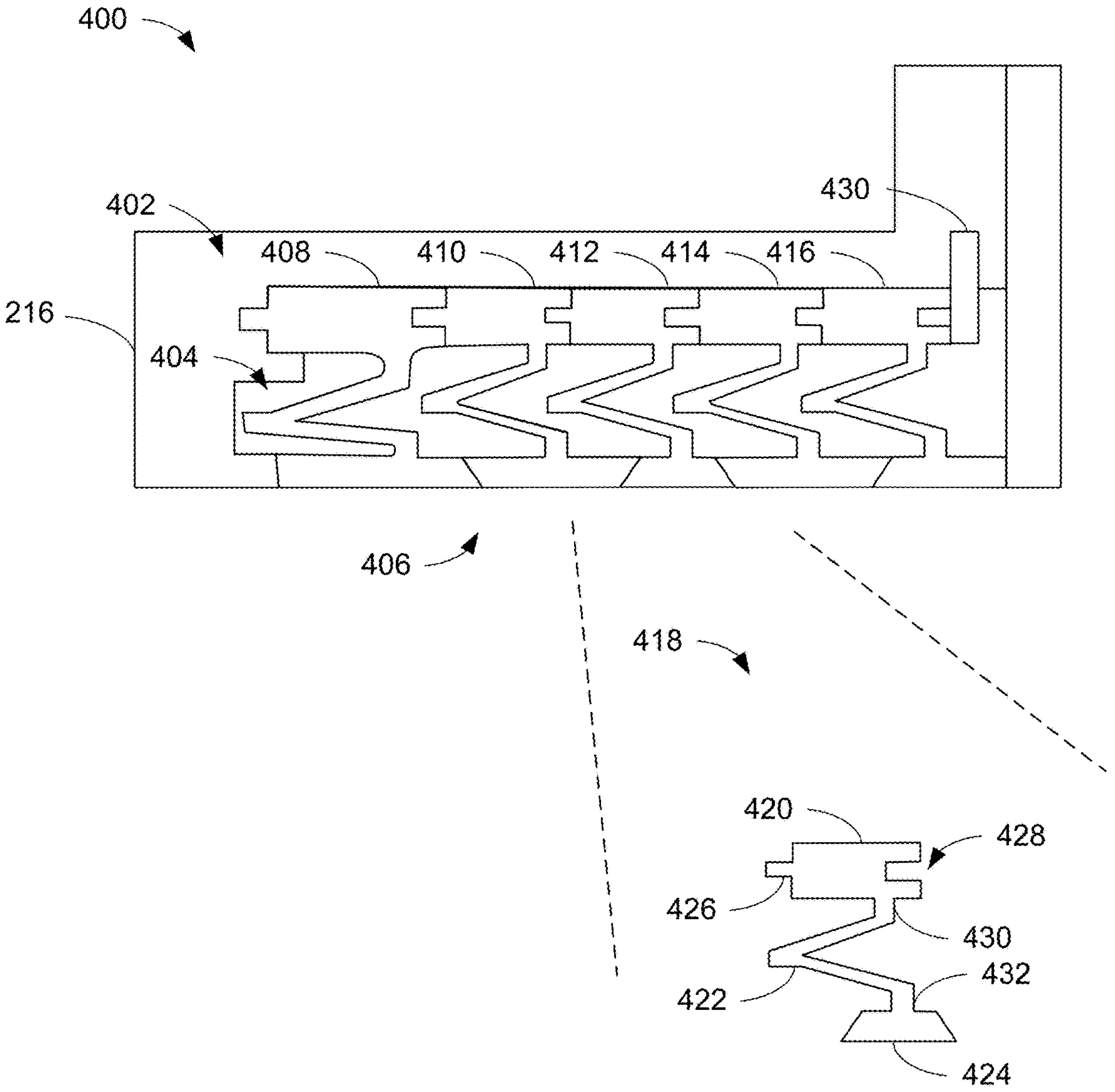
FIG. 4
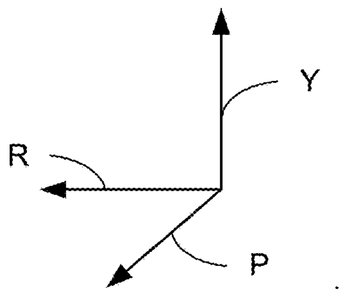

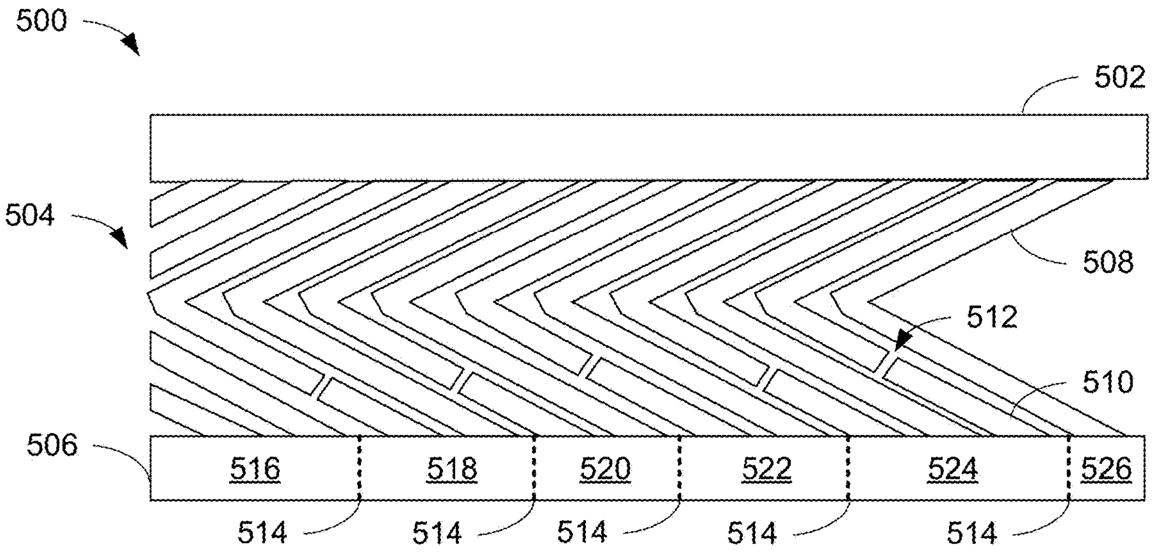
FIG. 5
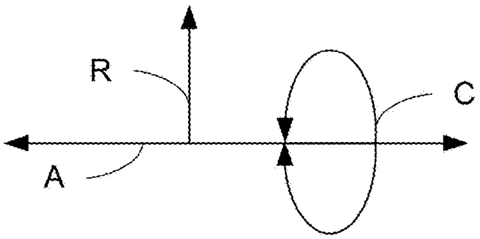

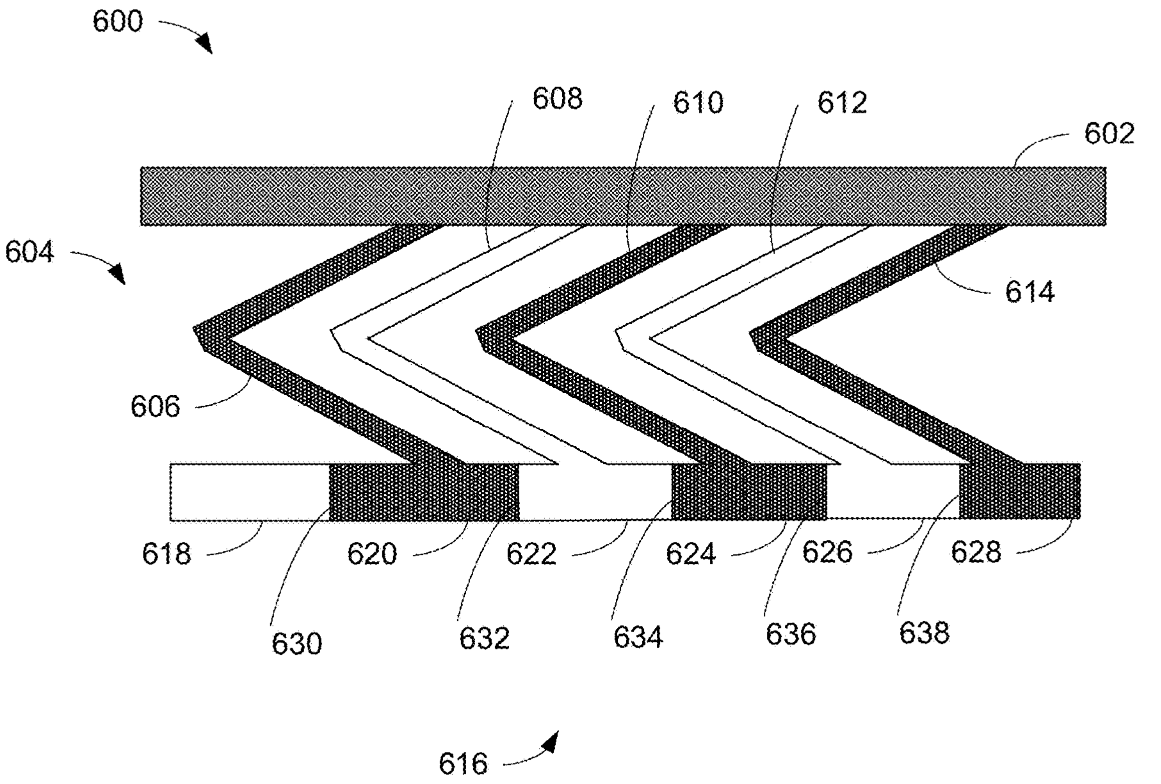
FIG. 6
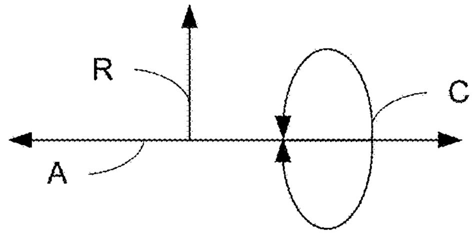

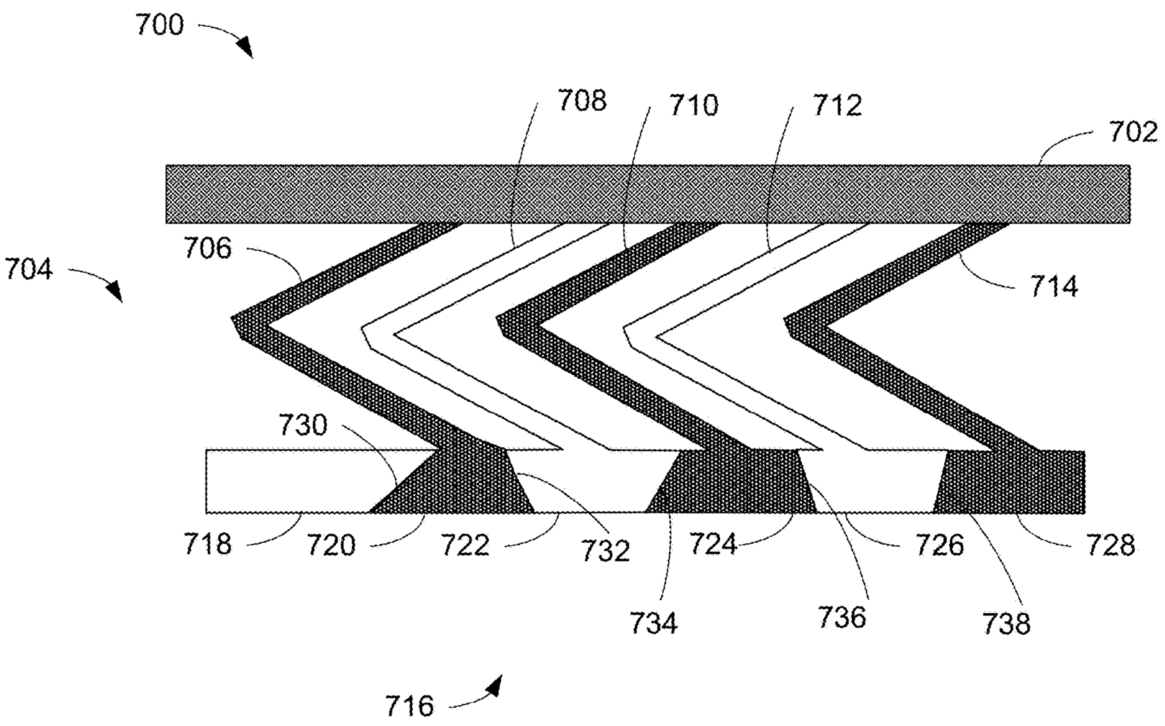
FIG. 7
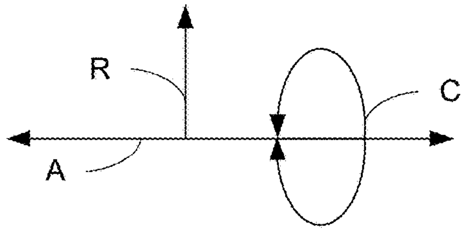

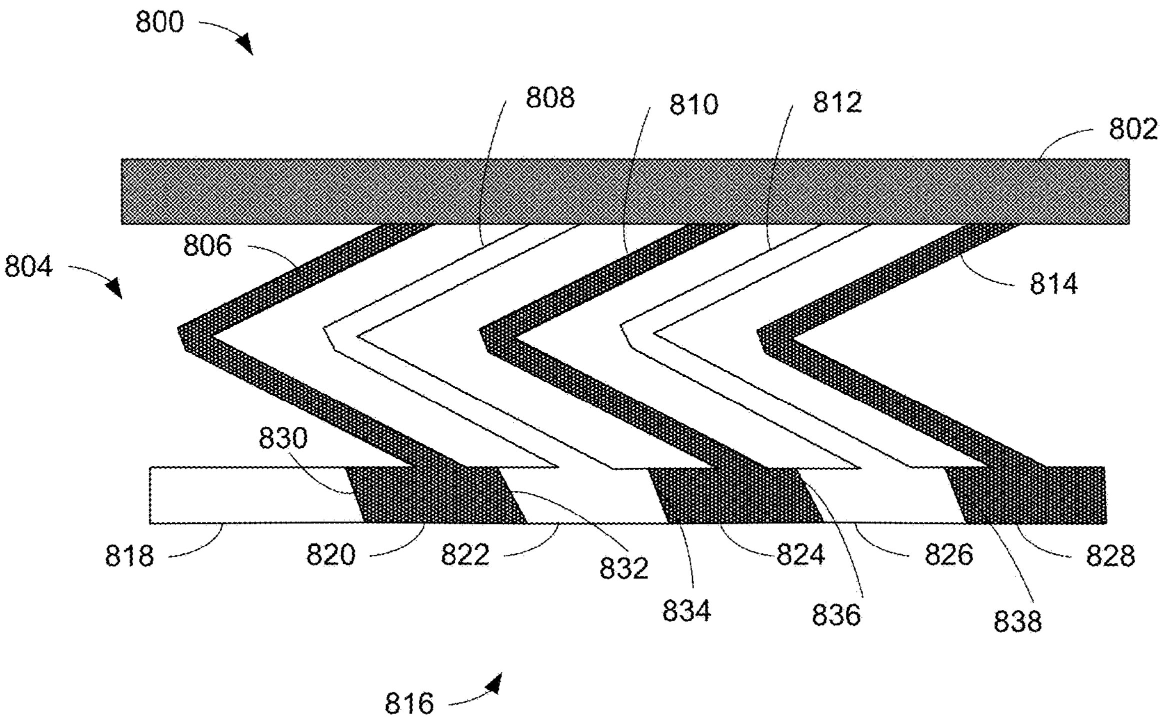
FIG. 8
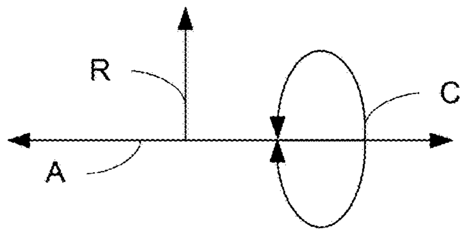

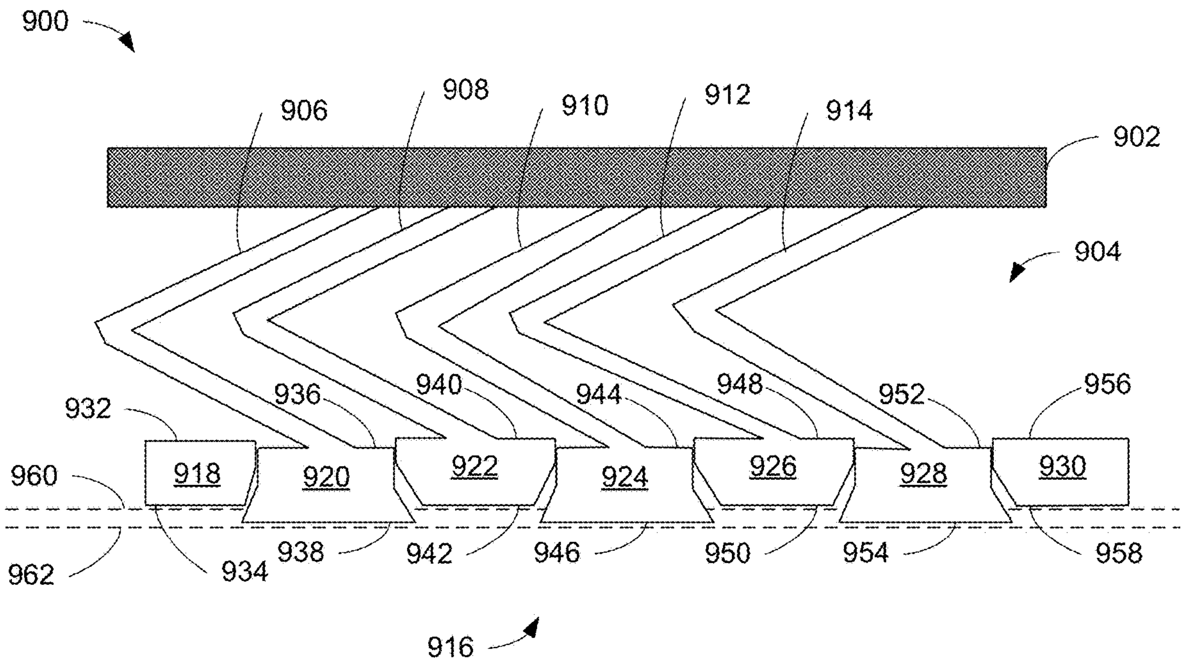
FIG. 9A
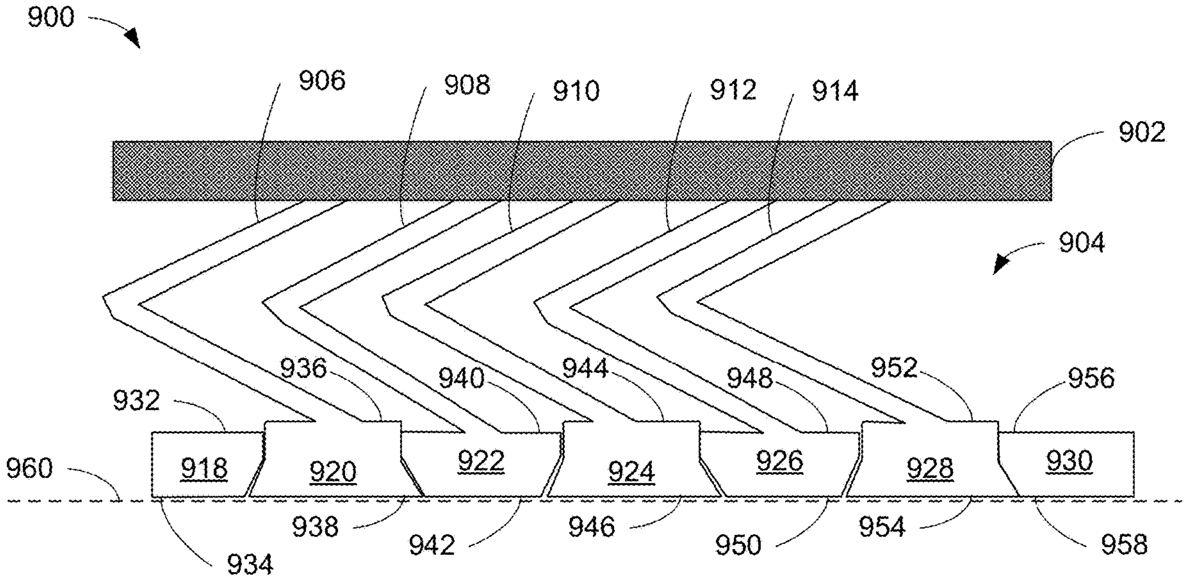
FIG. 9B
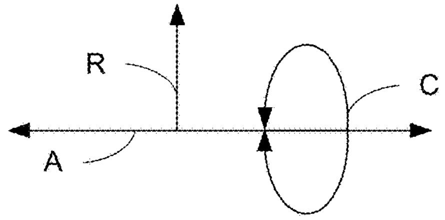

COMPLIANT SHROUD DESIGNS WITH VARIABLE STIFFNESS

CROSS-REFERENCE TO RELATED APPLICATIONS

This patent arises from a continuation of U.S. patent application Ser. No. 18/463,970, filed on Sep. 8, 2023, which is a continuation of U.S. patent application Ser. No. 17/343,454, filed on Jun. 9, 2021, both of which are incorporated herein by reference in their entireties.

FIELD OF THE DISCLOSURE

This disclosure relates generally to shrouds for gas turbines, and, more particularly, to shroud designs.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

BRIEF SUMMARY

Methods, apparatus, systems, and articles of manufacture for compliant shroud designs with variable stiffness are disclosed.

Certain examples provide a shroud assembly for a gas turbine engine including a first shroud arm having a first end and a second end, the first end to couple to an outer wall and the second end to couple to a first shroud pad, and a second shroud arm having a first end and a second end, the first end to couple to the outer wall and the second end to couple to a second shroud pad, at least one of the first shroud pad or the second shroud pad to move radially outward toward the outer wall in response to a rotor blade contacting the at least one of the first shroud pad or the second shroud pad.

Certain examples provide a gas turbine engine including a compressor including a compressor casing and at least one compressor blade, a combustion section, a turbine including a turbine casing and at least one turbine blade, a shaft to rotatably couple the compressor and the turbine, and a shroud assembly for at least one of the compressor or the turbine, the shroud assembly including a first shroud arm having a first end and a second end, the first end to couple to an outer wall and the second end to couple to a first shroud pad, and a second shroud arm having a first end and a second end, the first end to couple to the outer wall and the second end to couple to a second shroud pad, at least one of the first shroud pad or the second shroud pad to move radially outward toward the outer wall in response to a rotor blade contacting the at least one of the first shroud pad or the second shroud pad.

Certain examples provide a shroud apparatus including first means for reducing blade damage having a first end and a second end, the first end to couple to an outer wall of the shroud assembly and the second end to couple to a first shroud pad, and second means for reducing blade damage having a first end and a second end, the first end to couple to the outer wall and the second end to couple to a second shroud pad, at least one of the first shroud pad or the second shroud pad to move radially outward toward the outer wall in response to a rotor blade contacting the at least one of the first shroud pad or the second shroud pad.

BRIEF DESCRIPTION OF THE DRAWINGS

FIG. 3 illustrates an example cross-sectional side view of an example stage of the high pressure compressor of the turbofan shown in FIG. 1.

FIG. 4 illustrates an example cross-sectional side view of a first example shroud assembly.

FIG. 5 illustrates an example cross-sectional side view of a second example shroud assembly.

FIG. 6 illustrates an example cross-sectional side view of a third example shroud assembly.

FIG. 7 illustrates an example cross-sectional side view of a fourth example shroud assembly.

FIG. 8 illustrates an example cross-sectional side view of a fifth example shroud assembly.

FIGS. 9A-9B illustrate an example cross-sectional side view of a sixth example shroud assembly.

Figure 1:
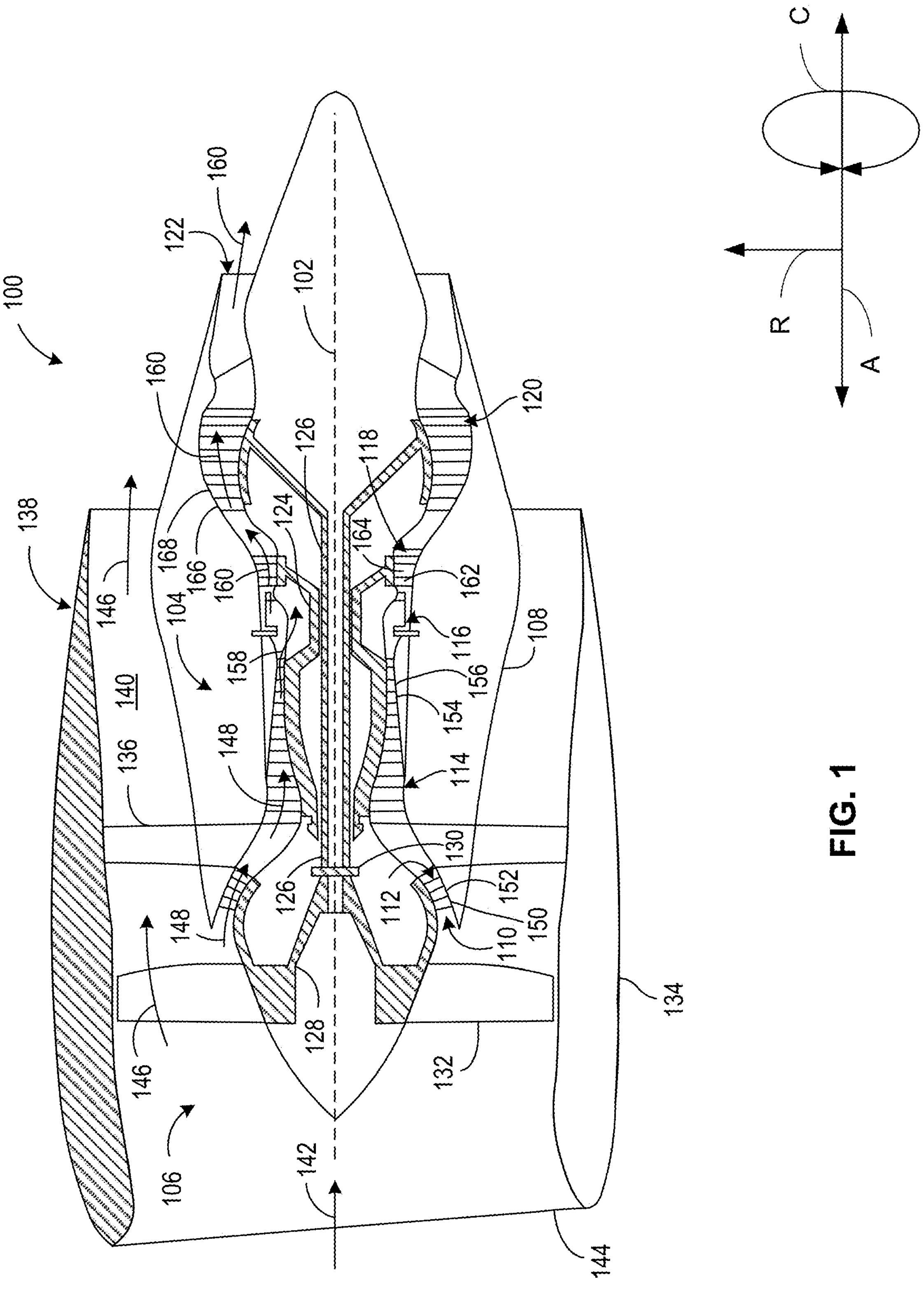
FIG. 1 illustrates an example gas turbine engine.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in “contact” with another part is defined to mean that there is no intermediate part between the two parts.

DETAILED DESCRIPTION

During normal engine operation, one or more rotor blades may contact the shroud. The contact (e.g., rubbing) between the rotor blades and the shroud causes eventual wear on the rotor blades and/or the shroud. There is a continuing need to reduce the blade tip rub loss during contact between rotor blades and the shroud during engine operation. Certain examples provide a compliant shroud design with variable stiffness that decreases rubbing, improving durability of the one or more rotor blades, the shroud, and associated engines. Examples disclosed herein increase clearance and reduce blade damage during operation, thus reducing repair costs.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore provided to describe an example implementation and not to be taken limiting on the scope of the subject matter described in this disclosure. Certain features from different aspects of the following description may be combined to form yet new aspects of the subject matter discussed below.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the turbofan 100. As used herein, "lateral" refers to the direction perpendicular to the axial vertical directions (e.g., into and out of the plane of FIGS. 1, 2, etc.).

Various terms are used herein to describe the orientation of features. As used herein, the orientation of features, forces and moments are described with reference to the axial direction, radial direction, and circumferential direction of the vehicle associated with the features, forces and moments. In general, the attached figures are annotated with a set of axes including the axial axis A, the radial axis R, and the circumferential axis C. Additionally or alternatively, the attached figures are annotated with a set of axes including the roll axis R, the pitch axis P, and the yaw axis Y.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines include rows of vanes, rows of rotor blades, etc. One or more shrouds may be positioned radially outward from and circumferentially enclose the rows of rotor blades. While example disclosed herein are described with reference to rotor blades in the compressor, the examples disclosed herein can be applied to rotor blades in any section of an engine. It is generally desirable to try to minimize the clearance gap between the one or more shrouds and the rotor blades to minimize leakage of air and/or combustion products. However, if the clearance gap is too small, there is a risk that the rotor blades may rub against the shrouds, which can result in decreased gas turbine efficiency, blade damage, etc.

In some prior examples, a pneumatic or hydraulic system may permit the shroud to move radially outward if the one or more rotor blades contact the shroud to reduce and/or prevent rubbing. However, pneumatic and hydraulic systems are complex and add significant cost and weight to the engine. A shroud that moves radially outward upon contact with a rotor blade and does not require a pneumatic or hydraulic system can increase a clearance benefit and reduce blade damage.

Examples disclosed herein can reduce undesired effects caused by rubbing between the one or more rotor blades and the shroud based on a shroud assembly that moves radially outward upon contact with the rotor blades. By segmenting the shroud of the gas turbine engine to form a shroud with variable stiffness, for example, the rubbing is mitigated. The shroud assembly with variable stiffness can include one or more shroud arms with one or more shroud pads.

Reference now will be made in detail to examples of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one example can be used with another example to yield a still further example. Thus, it is intended that the present disclosure covers such modifications and variations as come within the scope of the appended claims and their equivalents.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2:
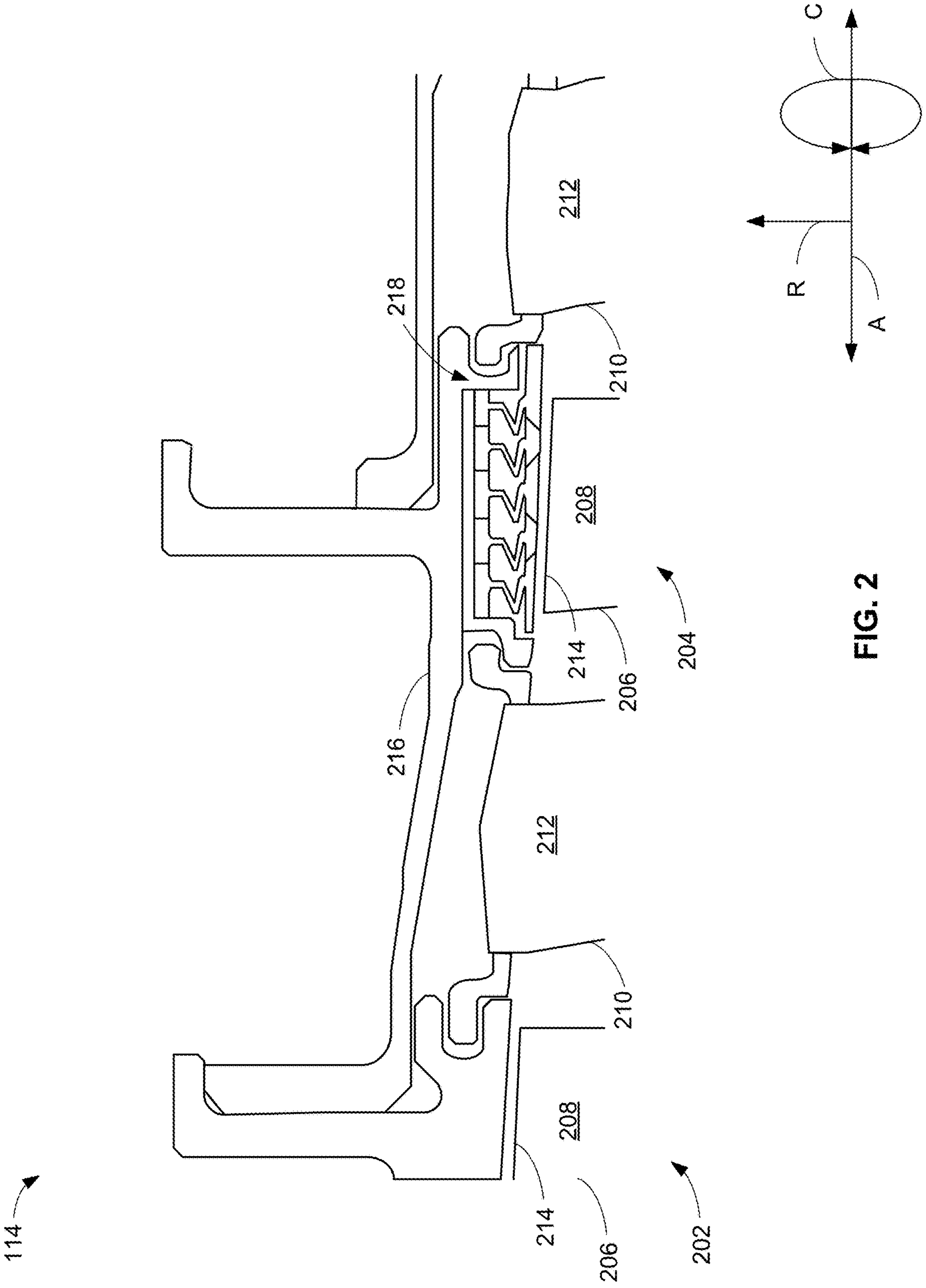
FIG. 2 illustrates an example cross-sectional side view of an example stage of the high pressure compressor of the turbofan shown in FIG. 1.

FIG. 2 illustrates an example cross-sectional side view of an example stage of the HP compressor 114 of the turbofan 100 shown in FIG. 1. In FIG. 2, the HP compressor 114 includes two compressor stages. For example, the HP compressor 114 includes, in serial flow order, a first stage 202 and a second stage 204. However, in examples disclosed herein, the total number of compressor stages may be more or less than two as is necessary or desired.

In FIG. 2, the first stage 202 includes a first row 206 of circumferentially spaced apart compressor rotor blades 208 and a second row 210 of circumferentially spaced apart compressor stator vanes 212. The second stage 204 includes the first row 206 of the rotor blades 208 and the second row 210 of the stator vanes 212. The rows 206 of the rotor blades 208 and the rows 210 of the stator vanes 212 are axially spaced along the HP shaft 124 of FIG. 1 (not illustrated). The rotor blades 208 couple to the HP shaft 124 and extend radially outward from the HP shaft 124 to the blade tips 214. The stator vanes 212 remain stationary relative to the rotor blades 208 during operation of the turbofan 100.

An example compressor casing or shell 216 circumferentially surrounds the rows 206 of the rotor blades 208 and the rows 210 of the stator vanes 212. The compressor casing 216 may be a unitary (e.g., a single casing for the entire HP compressor 114). Additionally or alternatively, the compressor casing 216 may be segmented such that each segment of the compressor casing 216 surrounds, e.g., a portion of one or more of the rows 206 of the rotor blades 208 of the first stage 202, the rows 206 of the rotor blades 208 of the second stage 204, etc.

The HP compressor 114 includes one or more shroud assemblies 218 that couple to the compressor casing 216. In FIG. 2, only one shroud assembly 218 corresponding to the row 206 of the rotor blades 208 of the second stage 204 is illustrated. However, additional shroud assemblies 218 may correspond to the rows 206 of the rotor blades 208 of additional stages (e.g., the first stage 202, etc.). The shroud assembly 218 is radially spaced from the blade tips 214 of the rotor blades 208 to form a clearance gap therebetween. It is generally desirable to minimize the clearance gap between the blade tips 214 and the shroud assembly 218, particularly during cruising operation of the turbofan 100, to reduce leakage over the blade tip 214 and through the clearance gap. The shroud assembly 218 can move radially outward relative to the compressor casing 216 if one or more of the rotor blades 208 contacts the shroud assembly 218. Thus, the shroud assembly 218 can be positioned closer to the blade tip 214 with respect to prior shrouds, thereby reducing the clearance gap. Example implementations of the shroud assembly 218 are described below in connection with FIGS. 3-9.

FIG. 3 illustrates an example cross-sectional side view of an example stage of the HP compressor 114 of the turbofan 100 shown in FIG. 1. The illustrated example of FIG. 3 includes the row 206 of the rotor blades 208. For example, the row 206 of the rotor blades 208 can correspond go the first stage 202, the second stage 204, etc. of FIG. 2. The rotor blades 208 include the blade tips 214. The HP compressor 114 includes the compressor casing 216 defining a shroud receiving cavity 302. The shroud receiving cavity 302 receives and positions the shroud assembly 218. The shroud receiving cavity 302 is generally axially aligned with and positioned radially outwardly from the row 206 of the rotor blades 208. The shroud assembly 218 includes an outer wall 304, shroud arms 306, and shroud pads 308. The outer wall 304 is coupled to the compressor casing 216.

In examples disclosed herein, the shroud assembly 218 is segmented in the axial direction. That is, the shroud assembly 218 includes the one or more shroud arms 306. In FIG. 3, the shroud arms 306 have a hairpin structure (e.g., "<"). However, the shroud arms 306 can additionally or alternatively have a mirror image geometry along the radial axis (e.g., >). However, the shroud arms 306 can have other geometries (e.g., vertical hairpin structures, a curved beam structure, triangular, quadrilateral, hexagonal, etc.). The shroud arms 306 include and/or are otherwise coupled to the shroud pads 308, which extend radially outwardly from the shroud receiving cavity 302. The shroud arms 306 and the shroud pads 308 can be any material suitable for the environment and compatible with the shroud for compliant shroud behavior (e.g., the shroud arms 306 compress in the radial direction within a selected tolerance, etc.). The shroud arms 306 and the shroud pads 308 can be the same material or different materials. In some examples, the shroud arms 306 and/or the shroud pads 308 are steel. However, the shroud arms 306 and/or the shroud pads 308 can additionally or alternatively be alloys of titanium, iron, nickel with selected strength, fatigue, and/or other material characteristics, etc. Additionally or alternatively, the shroud arms 306 and/or the shroud pads 308 are smart materials (e.g., shape memory alloys, etc.). In some examples, the shroud pads 308 are coated. The shroud pad coating can be any material suitable for the environment and compatible with the shroud (e.g., to withstand contact from the blade tips 214, etc.). For example, the shroud pad coating can be ceramic. In some examples, the shroud pads 308 are all coated in a hard material or a soft material. In some examples, materials used in the coating of the shroud pads 308 alternate in the axial direction (e.g., hard and soft coating on alternating shroud pads).

During engine operation, the blade tips 214 of the rotor blades 208 may contact the shroud pads 308. Upon contact, one or more of the shroud pads 308 move radially inward into the shroud receiving cavity 302. That is, the shroud arms 306 compress in the radial direction to enable the radially inward movement of the shroud pads 308. For example, the shroud arms 306 cushion and/or absorb the impact of the blade tips 214. Thus, the radially inward movement of the shroud pads 308 reduces the impact between the blade tips 214 and the shroud pads 308.

FIG. 4 illustrates an example cross-sectional side view of an example first shroud assembly 400. The illustrated example of FIG. 4 includes the compressor casing 216 coupled to the shroud assembly 400. The shroud assembly 400 includes an outer wall 402, shroud arms 404, and shroud pads 406. The shroud assembly 400 is segmented in the axial direction. That is, the shroud assembly 400 includes a first shroud segment 408, a second shroud segment 410, a third shroud segment 412, a fourth shroud segment 414, and a fifth shroud segment 416. However, the shroud assembly 400 can include a fewer or greater number of shroud segments (e.g., four shroud segments, six shroud segments, etc.). The shroud assembly 400 is an alternative implementation of the shroud assembly 218 of FIGS. 2 and/or 3. For example, the outer wall 402 is segmented and includes anti-rotation tabs (described below).

The illustrated example of FIG. 4 includes a shroud segment 418 (sometimes referred to herein as "axial shroud segment 418") (e.g., the shroud segments 408, 410, 412, 414, 416). The shroud segment 418 includes an outer wall segment 420 (e.g., corresponding to the outer wall 402), a shroud arm 422 (e.g., the shroud arms 404), and a shroud pad 424 (e.g., the shroud pads 406). The shroud arm 422 includes a first end 432 and a second end 434. For example, the shroud arm 422 is coupled to the outer wall segment 420 via the first end 432. The shroud arm 422 is coupled to the shroud pad 424 via the second end 434. The outer wall segment 420 includes an anti-rotation tab 426. The outer wall segment 420 defines an anti-rotation cavity 428. In some examples, the anti-rotation cavity 428 corresponds to the geometry of the anti-rotation tab 426. The anti-rotation tab 426 and the anti-rotation cavity 428 are rectangular. However, the anti-rotation tab 426 and/or the anti-rotation cavity 428 can be any suitable geometry (e.g., triangular, etc.). The anti-rotation cavity 428 receives the anti-rotation tab 426 of the adjacent outer wall segments 420. For example, the anti-rotation cavity 428 of the first shroud segment 408 receives the anti-rotation tab 426 of the second shroud segment 410, the anti-rotation cavity 428 of the second shroud segment 410 receives the anti-rotation tab 426 of the third shroud segment 412, etc. In examples disclosed herein, the anti-rotation tabs 426 prevent and/or reduce rotation of the shroud assembly 400 about the pitch axis. That is, the anti-rotation tabs 426 reduce rotation of the shroud segments 408, 410, 412, 414, 416 about the pitch axis.

In FIG. 4, the shroud assembly 400 is coupled to the compressor casing 216 by a retaining ring 430. For example, the retaining ring 430 is coupled to the fifth shroud segment 416 and the compressor casing 216. Additionally or alternatively, the shroud assembly 400 is integrally coupled to the compressor casing 216. For example, the outer wall 402 can be brazed to the compressor casing 216.

FIG. 5 illustrates an example cross-sectional side view of an example second shroud assembly 500. The second shroud assembly 500 includes an outer wall 502, shroud arms 504, and shroud pads 506. In FIG. 5, the shroud arms 504 include solid shroud arms 508 and air-damping shroud arms 510 (sometimes referred to herein as "air cushioning hairpin 510"). For example, the air-damping shroud arms 510 includes air-damping holes 512. The shroud assembly 500 includes five of the solid shroud arms 508 and five of the air-damping shroud arms 510. However, the shroud assembly 500 can include a fewer or greater number of the solid shroud arms 508 and/or the air-damping shroud arms 510. In some examples, the solid shroud arms 508 and the air-damping shroud arms 510 alternate in the axial direction. The shroud pads 506 includes air-damping holes 514. The air-damping holes 512 of the air-damping shroud arms 510 and/or the air-damping holes 514 of the shroud pads 506 enable an active/passive control system. That is, the air-damping holes 512, 514 enable air cushioning to dampen vibration of the shroud assembly 500. The active/passive control system is described in further detail below in connection with FIG. 15.

The air-damping holes 514 segment the shroud pads 506 into a first shroud pad segment 516, a second shroud pad segment 518, a third shroud pad segment 520, a fourth shroud pad segment 522, a fifth shroud pad segment 524, and a sixth shroud pad segment 526. In some examples, the shroud pad segments 516, 518, 520, 522, 524, 526 have the same axial length (e.g., the air-damping holes 514 are uniformly spaced apart along the axial axis). In some examples, the shroud pad segments 516, 518, 520, 522, 524, 526 do not have the same axial length. The shroud pad segments 516, 518, 520, 522, 524, 526 couple to one or more of the shroud arms 504 (e.g., the solid shroud arm 508 and/or the air-damping shroud arm 510).

FIGS. 6-8 illustrate various implementations of a shroud assembly to move radially inward (e.g., into the shroud receiving cavity, not illustrated) in response to contact from the one or more rotor blades (not illustrated). For example, the cross-sectional side view of the shroud pads of the third shroud assembly of FIG. 6 are rectangular. In contrast, the cross-sectional side views of the shroud pads of the shroud assemblies of FIGS. 7-8 are not rectangular.

FIG. 6 illustrates an example cross-sectional side view of an example third shroud assembly 600. The third shroud assembly 600 includes an outer wall 602 and shroud arms 604. The shroud arms 604 couple to the outer wall 602. The shroud arms 604 and the outer wall 602 can be integrally coupled. The shroud arms 604 include a first shroud arm 606, a second shroud arm 608, a third shroud arm 610, a fourth shroud arm 612, and a fifth shroud arm 614. However, the shroud arms 604 can include a greater or fewer number of shroud arms. The shroud arms 604 of the shroud assembly 600 have a variable stiffness, K. For example, the first shroud arm 606, the third shroud arm 610, and the fifth shroud arm 614 have a first stiffness, K1. The second shroud arm 608 and the fourth shroud arm 612 have a second stiffness, K2. That is, the stiffness of the shroud arms 604 alternate in the axial direction. In some examples, the stiffness of the shroud arms 604 do not alternate (e.g., have the same stiffness, have different stiffnesses, etc.).

The shroud assembly 600 includes shroud pads 616. The shroud pads 616 include a first shroud pad 618, a second shroud pad 620, a third shroud pad 622, a fourth shroud pad 624, a fifth shroud pad 626, and a sixth shroud pad 628. That is, the shroud pads 616 of the shroud assembly 600 are independent shroud pads. Thus, the shroud pads 616 form split lines. For example, the first shroud pad 618 and the second shroud pad 620 form a first split line 630, the second shroud pad 620 and the third shroud pad 622 form a second split line 632, the third shroud pad 622 and the fourth shroud pad 624 form a third split line 634, the fourth shroud pad 624 and the fifth shroud pad 626 form a fourth split line 636, and the fifth shroud pad 626 and the sixth shroud pad 628 form a fifth split line 638. The split lines 630, 632, 634, 636, 638 of the shroud assembly 600 are parallel to the radial axis. That is, the cross-sectional view of the shroud pads 618, 620, 622, 624, 626, 628 are rectangular.

The shroud pads 616 are coupled to the shroud arms 604. For example, the first shroud arm 606 is coupled to the second shroud pad 620, the second shroud arm 608 is coupled to the third shroud pad 622, etc. In FIG. 6, the shroud arm corresponding to the first shroud pad 618 is not illustrated. The shroud pads 616 can have the same stiffness as the corresponding shroud arms 604 (e.g., the first shroud arm 606 and the second shroud pad 620 have the same stiffness, K1, the second shroud arm 608 and the third shroud pad 622 have the same stiffness, K2, etc.). However, the shroud pads 616 can have different stiffnesses than the corresponding shroud arms 604.

FIG. 7 illustrates an example cross-sectional side view of an example fourth shroud assembly 700. The fourth shroud assembly 700 includes an outer wall 702 and shroud arms 704. The shroud arms 704 couple to the outer wall 702. For example, the shroud arms 704 and the outer wall 702 can be integrally coupled. The shroud arms 704 include a first shroud arm 706, a second shroud arm 708, a third shroud arm 710, a fourth shroud arm 712, and a fifth shroud arm 714. However, the shroud arms 704 can include a greater or fewer number of shroud arms. The shroud arms 704 of the shroud assembly 700 have a variable stiffness, K. For example, the first shroud arm 706, the third shroud arm 710, and the fifth shroud arm 714 have a first stiffness, K1. The second shroud arm 708 and the fourth shroud arm 712 have a second stiffness, K2. That is, the stiffness of the shroud arms 704 alternate in the axial direction. In some examples, the stiffness of the shroud arms 704 do not alternate (e.g., the shroud arms 704 have the same stiffness, have different stiffnesses, etc.).

The shroud assembly 700 includes shroud pads 716. The shroud pads 716 include a first shroud pad 718, a second shroud pad 720, a third shroud pad 722, a fourth shroud pad 724, a fifth shroud pad 726, and a sixth shroud pad 728. That is, the shroud pads 716 of the shroud assembly 700 are independent shroud pads. Thus, the shroud pads 716 form split lines. For example, the first shroud pad 718 and the second shroud pad 720 form a first split line 730, the second shroud pad 720 and the third shroud pad 722 form a second split line 732, the third shroud pad 722 and the fourth shroud pad 724 form a third split line 734, the fourth shroud pad 724 and the fifth shroud pad 726 form a fourth split line 736, and the fifth shroud pad 726 and the sixth shroud pad 728 form a fifth split line 738. The split lines 730, 732, 734, 736, 738 of the shroud assembly 700 are not parallel to the radial axis. That is, unlike the shroud assembly 600 of FIG. 6, the cross-sectional view of the shroud pads 718, 720, 722, 724, 726, 728 are not rectangular. Further, the split lines 730, 732, 734, 736, 738 are not parallel to each other. Thus, the shroud pads 718, 720, 722, 724, 726, 728 are interlocking.

The shroud pads 716 are coupled to the shroud arms 704. For example, the first shroud arm 706 is coupled to the second shroud pad 720, the second shroud arm 708 is coupled to the third shroud pad 722, etc. In FIG. 7, the shroud arm corresponding to the first shroud pad 718 is not illustrated. The shroud pads 716 can have the same stiffness as the corresponding shroud arms 704 (e.g., the first shroud arm 706 and the second shroud pad 720 have the same stiffness, K1, the second shroud arm 708 and the third shroud pad 722 have the same stiffness, K2, etc.). However, the shroud pads 716 can have different stiffnesses than the corresponding shroud arms 704.

FIG. 8 illustrates an example cross-sectional side view of an example fifth shroud assembly 800. The fifth shroud assembly 800 includes an outer wall 802 and shroud arms 804. The shroud arms 804 couple to the outer wall 802. For example, the shroud arms 804 and the outer wall 802 can be integrally coupled. The shroud arms 804 include a first shroud arm 806, a second shroud arm 808, a third shroud arm 810, a fourth shroud arm 812, and a fifth shroud arm 814. However, the shroud arms 804 can include a greater or fewer number of shroud arms. The shroud arms 804 of the shroud assembly 800 have a variable stiffness, K. For example, the first shroud arm 806, the third shroud arm 810, and the fifth shroud arm 814 have a first stiffness, K1. The second shroud arm 808 and the fourth shroud arm 812 have a second stiffness, K2. That is, the stiffness of the shroud arms 804 alternate in the axial direction. In some examples, the stiffness of the shroud arms 804 do not alternate (e.g., the shroud arms 804 have the same stiffness, have different stiffnesses, etc.).

The shroud assembly 800 includes shroud pads 816. The shroud pads 816 include a first shroud pad 818, a second shroud pad 820, a third shroud pad 822, a fourth shroud pad 824, a fifth shroud pad 826, and a sixth shroud pad 828. That is, the shroud pads 816 of the shroud assembly 800 are independent shroud pads. Thus, the shroud pads 816 form split lines. For example, the first shroud pad 818 and the second shroud pad 820 form a first split line 830, the second shroud pad 820 and the third shroud pad 822 form a second split line 832, the third shroud pad 822 and the fourth shroud pad 824 form a third split line 834, the fourth shroud pad 824 and the fifth shroud pad 826 form a fourth split line 836, and the fifth shroud pad 826 and the sixth shroud pad 828 form a fifth split line 838. The split lines 830, 832, 834, 836, 838 of the shroud assembly 800 are not parallel to the radial axis. That is, unlike the shroud assembly 600 of FIG. 6, the cross-sectional view of the shroud pads 818, 820, 822, 824, 826, 828 are not rectangular. Further, unlike the split lines 730, 732, 734, 736, 738 of FIG. 7, the split lines 830, 832, 834, 836, 838 are parallel to each other. The shroud pads 818, 820, 822, 824, 826, 828 are interlocking.

The shroud pads 816 are coupled to the shroud arms 804. For example, the first shroud arm 806 is coupled to the second shroud pad 820, the second shroud arm 808 is coupled to the third shroud pad 822, etc. In the illustrated example of FIG. 8, the shroud arm corresponding to the first shroud pad 818 is not illustrated. The shroud pads 816 can have the same stiffness as the corresponding shroud arms 804 (e.g., the first shroud arm 806 and the second shroud pad 820 have the same stiffness, K1, the second shroud arm 808 and the third shroud pad 822 have the same stiffness, K2, etc.). However, the shroud pads 816 can have different stiffnesses than the corresponding shroud arms 804.

FIG. 9A illustrates an example cross-sectional side view of an example sixth shroud assembly 900. The sixth shroud assembly 900 includes an outer wall 902 and shroud arms 904. The shroud arms 904 couple to the outer wall 902. For example, the shroud arms 904 and the outer wall 902 can be integrally coupled. The shroud arms 904 include a first shroud arm 906, a second shroud arm 908, a third shroud arm 910, a fourth shroud arm 912, and a fifth shroud arm 914. However, the shroud arms 904 can include a greater or fewer number of shroud arms. The shroud arms 904 of the shroud assembly 900 have a variable stiffness, K. For example, the first shroud arm 906, the third shroud arm 910, and the fifth shroud arm 914 have a first stiffness, K1. The second shroud arm 908 and the fourth shroud arm 912 have a second stiffness, K2. That is, the stiffness of the shroud arms 904 alternate in the axial direction. In FIG. 9A, the first stiffness is less than the second stiffness (e.g., K1<K2). In some examples, the first stiffness is 10-20% of the stiffness of the casing (e.g., the compressor casing 216 of FIG. 2). In some examples, the second stiffness is 2-5 times greater than the first stiffness.

The shroud assembly 900 includes shroud pads 916. The shroud pads 916 include a first shroud pad 918, a second shroud pad 920, a third shroud pad 922, a fourth shroud pad 924, a fifth shroud pad 926, a sixth shroud pad 928, and a seventh shroud pad 930. That is, the shroud pads 916 of the shroud assembly 900 are independent shroud pads. The shroud pads 916 are coupled to the shroud arms 904. For example, the first shroud arm 906 is coupled to the second shroud pad 920, the second shroud arm 908 is coupled to the third shroud pad 922, etc. In FIG. 9, the shroud arms corresponding to the first shroud pad 918 and the seventh shroud pad 930 are not illustrated. The shroud pads 916 can have the same stiffness as the corresponding shroud arms 904 (e.g., the first shroud arm 906 and the second shroud pad 920 have the same stiffness, K1, the second shroud arm 908 and the third shroud pad 922 have the same stiffness, K2, etc.).

The shroud pads 918, 920, 922, 924, 926, 928, 930 are interlocking with a stepped geometry. For example, the first shroud pad 918 has a shroud pad base 932 and a shroud pad tip 934, the second shroud pad 920 has a shroud pad base 936 and a shroud pad tip 938, the third shroud pad 922 has a shroud pad base 940 and a shroud pad tip 942, the fourth shroud pad 924 has a shroud pad base 944 and a shroud pad tip 946, the fifth shroud pad 926 has a shroud pad base 948 and a shroud pad tip 950, the sixth shroud pad 928 has a shroud pad base 952 and a shroud pad tip 954, and the seventh shroud pad 930 has a shroud pad base 956 and a shroud pad tip 958. The shroud pad bases 932, 940, 948, 956 have a greater axial length than the corresponding shroud pad tips 934, 942, 950, 958. The shroud pad bases 936, 944, 952 have a shorter axial length than the corresponding shroud pad tips 938, 946, 954.

The shroud pads 918, 922, 926, 930 are at a first position and the shroud pads 920, 924, 928 are at a second position. That is, the shroud pad tips 934, 942, 950, 958 of the shroud pads 918, 922, 926, 930 are at a first position 960. The shroud pad tips 938, 946, 954 of the shroud pads 920, 924, 928 are at a second position 962. The second position 962 is located radially inward (e.g., a lower radial position) with respect to the first position 960. Thus, the shroud pad tips 938, 946, 954 may be the first point of contact with rotor blades (not illustrated).

FIG. 9B illustrates an example cross-sectional side view of the sixth shroud assembly 900 of FIG. 9A. With respect to FIG. 9A, the shroud pads 918, 920, 922, 924, 926, 928, 930 are aligned. For example, the blade tips 214 of the rotor blades 208 of FIG. 2 contact the shroud pad tips 938, 946, 954. Upon contact, the shroud pads 920, 924, 928 move radially outward from the second position 962 to the first position 960. For example, the shroud arms 906, 910, 914 corresponding to the shroud pads 920, 924, 928 compress along the radial axis. In some examples, the movement of the shroud pads 920, 924, 928 is limited by the shroud pads 918, 922, 926, 930. That is, the shroud arms 908, 912 and/or the shroud pads 918, 922, 926, 930 act as deflection limiters. For example, because the shroud arms 908, 912 have a higher stiffness than the shroud arms 906, 910, 914, if the rotor blades contact the shroud pads 918, 922, 926, 930, the shroud pads 918, 922, 926, 930 do not move and/or move radially outward a negligible amount. Thus, the shroud pad bases 932, 940, 948, 956 limit the radial movement of the shroud pads 920, 924, 928.

Figure 10:
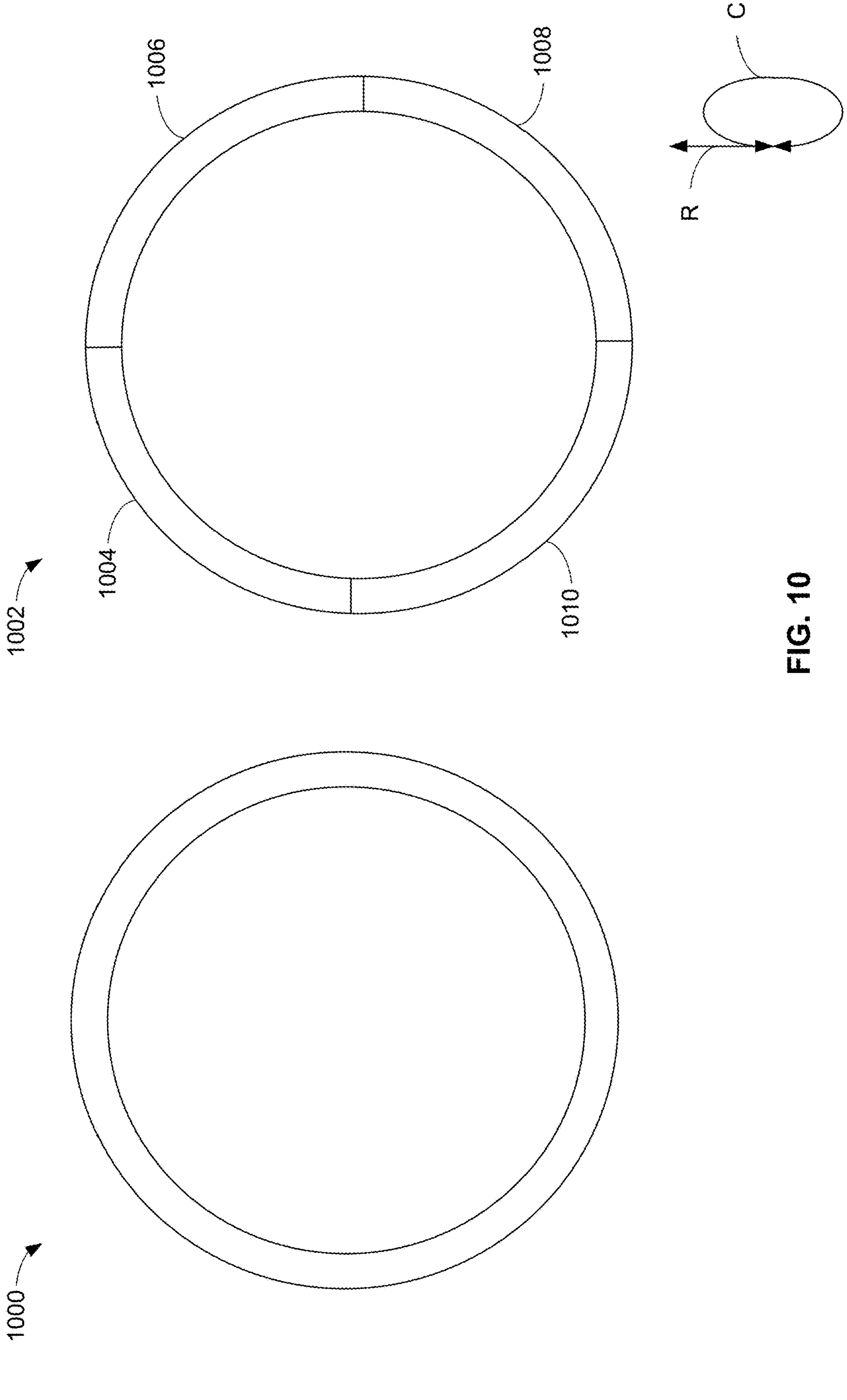
FIG. 10 illustrates an example front view of the shroud assemblies of FIGS. 2-9.

FIG. 10 illustrates an example front view of the shroud assemblies of FIGS. 2-9. FIG. 10 includes a circumferential shroud segment 1000 and circumferential shroud segments 1002. For example, the circumferential shroud segments 1000, 1002 can be implemented by the shroud assemblies of FIGS. 2-9 (e.g., the shroud assemblies 218, 400, 500, 600, 700, 800, 900). The circumferential shroud segment 1000 is not segmented circumferentially. That is, the axial shroud segments (not illustrated) of the circumferential shroud segment 1000 are 360 degree axial hairpin dampers (e.g., 360 degree axial segments). In contrast, the circumferential shroud segments 1002 are segmented circumferentially. The circumferential shroud segments 1002 include a first circumferential shroud segment 1004, a second circumferential shroud segment 1006, a third circumferential shroud segment 1008, and a fourth circumferential shroud segment 1010. However, the circumferential shroud segments 1002 can include a greater or fewer number of circumferential shroud segments (e.g., three circumferential shroud segments, five circumferential shroud segments, etc.). The circumferential shroud segments 1004, 1006, 1008, 1010 are 90 degree segments. However, the circumferential shroud segments 1002 can include 30 degree circumferential shroud segments, 180 degree circumferential shroud segments, etc. In some examples, the circumferential shroud segments are the same size (e.g., circumferential length). In some examples, the circumferential shroud segments are not the same size. In some examples, circumferential shroud segments 1004, 1006, 1008, 1010 can be coupled via bolts, screws, etc.

Figure 11A:
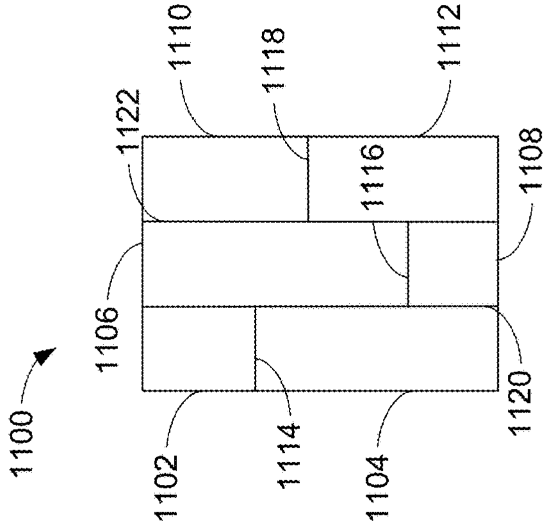
FIGS. 11A-11C illustrate example bottom views of shroud pads.
Figure 11B:
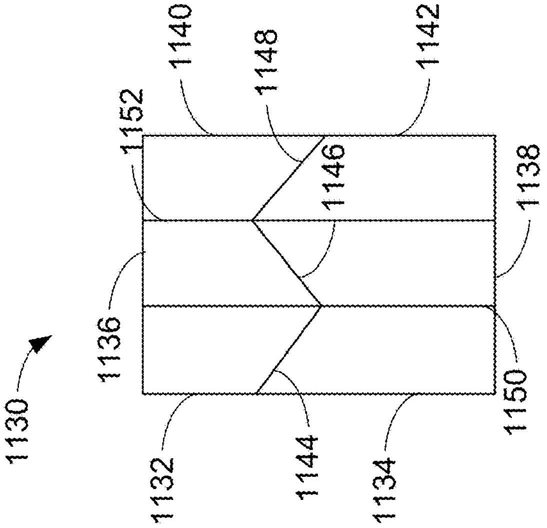
Figure 11C:
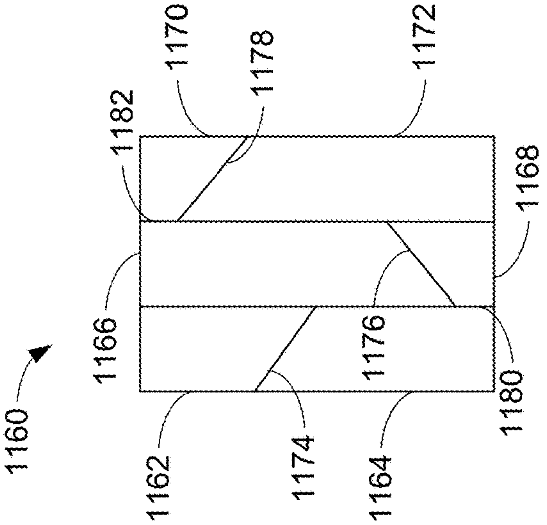
Figure 12:
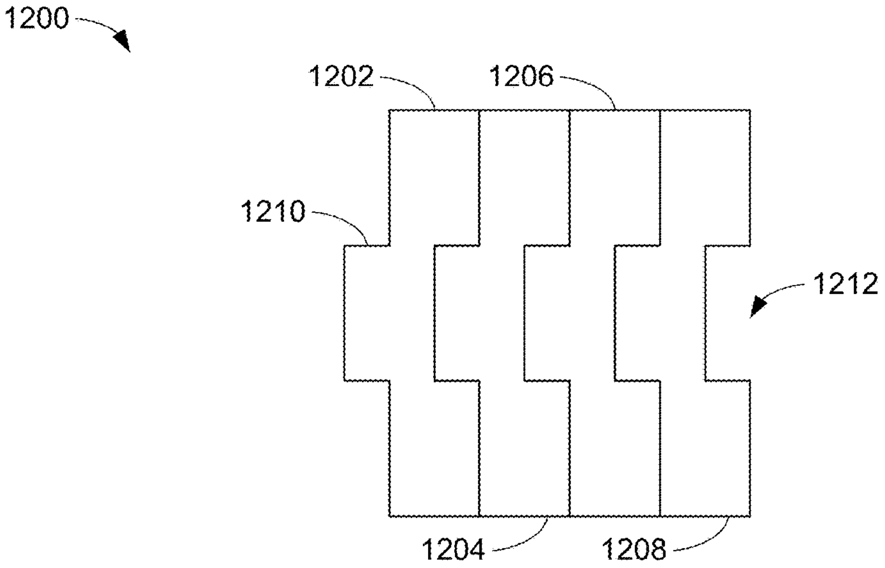
FIG. 12 illustrates an example bottom view of shroud pads including anti-rotation tabs.

FIGS. 11A-12 illustrate various implementations of shroud pads. FIGS. 11A-12 illustrate bottom views of the shroud pads. The shroud pads of the shroud assemblies of FIGS. 2-9 can be implemented by the shroud pads illustrated in FIGS. 11A-12. For example, the shroud pads of FIGS. 2-9 can be circumferentially segmented parallel to the axial axis, at the same circumferential location (e.g., aligned), etc. Additionally or alternatively, the shroud pads of FIGS. 2-9 can include anti-rotation tabs.

FIG. 11A illustrates an example bottom view of shroud pads 1100. The shroud pads 1100 include a first shroud pad 1102, a second shroud pad 1104, a third shroud pad 1106, a fourth shroud pad 1108, a fifth shroud pad 1110, and a sixth shroud pad 1112. The first shroud pad 1102 and the second shroud pad 1104 form a first split line 1114, the third shroud pad 1106 and the fourth shroud pad 1108 form a second split line 1116, and the fifth shroud pad 1110 and the sixth shroud pad 1112 form a third split line 1118. That is, the shroud pads 1100 are segmented circumferentially. The shroud pads 1102, 1104, 1106, 1108 form a fourth split line 1120 and the shroud pads 1106, 1108, 1110, 1112 form a fifth split line 1122. The split lines 1114, 1116, 1118 are parallel to the axial axis. That is, the split lines 1114, 1116, 1118 are perpendicular to the split lines 1120, 1122.

FIG. 11B illustrates an example bottom view of shroud pads 1130. The shroud pads 1130 include a first shroud pad 1132, a second shroud pad 1134, a third shroud pad 1136, a fourth shroud pad 1138, a fifth shroud pad 1140, and a sixth shroud pad 1142. The first shroud pad 1132 and the second shroud pad 1134 form a first split line 1144, the third shroud pad 1136 and the fourth shroud pad 1138 form a second split line 1146, and the fifth shroud pad 1140 and the sixth shroud pad 1142 form a third split line 1148. That is, the shroud pads 1130 are segmented circumferentially. The shroud pads 1132, 1134, 1136, 1138 form a fourth split line 1150 and the shroud pads 1136, 1138, 1140, 1142 form a fifth split line 1152. The split lines 1144, 1146, 1148 are not parallel to the axial axis. That is, the split lines 1144, 1146, 1148 are not perpendicular to the split lines 1150, 1152. In FIG. 11B, the split lines 1144, 1146, 1148 are not parallel to each other. However, in some examples, the split lines 1144, 1146, 1148 are parallel to each other. The split lines 1144, 1146, 1148 are aligned.

FIG. 11C illustrates an example bottom view of shroud pads 1160. The shroud pads 1160 include a first shroud pad 1162, a second shroud pad 1164, a third shroud pad 1166, a fourth shroud pad 1168, a fifth shroud pad 1170, and a sixth shroud pad 1172. The first shroud pad 1162 and the second shroud pad 1164 form a first split line 1174, the third shroud pad 1166 and the fourth shroud pad 1168 form a second split line 1176, and the fifth shroud pad 1170 and the sixth shroud pad 1172 form a third split line 1178. That is, the shroud pads 1160 are segmented circumferentially. The shroud pads 1162, 1164, 1166, 1168 form a fourth split line 1180 and the shroud pads 1166, 1168, 1170, 1172 form a fifth split line 1182. The split lines 1174, 1176, 1178 are not parallel to the axial axis. That is, the split lines 1174, 1176, 1178 are not perpendicular to the split lines 1180, 1182. In FIG. 11C, the split lines 1174, 1176, 1178 are not parallel to each other. However, in some examples, the split lines 1174, 1176, 1178 are parallel to each other. The split lines 1174, 1176, 1178 are not aligned (e.g., the split lines 1174, 1176, 1178 are offset).

FIG. 12 illustrates an example bottom view of shroud pads 1200 including anti-rotation tabs. The shroud pads 1200 include a first shroud pad 1202, a second shroud pad 1204, a third shroud pad 1206, and a fourth shroud pad 1208. For example, the shroud pads 1202, 1204, 1206, 1208 are coupled to corresponding shroud arms and/or outer walls (not illustrated). The shroud pads 1202, 1204, 1206, 1208 include an anti-rotation tab 1210 (not labeled with respect to the shroud pads 1204, 1206, 1208). The shroud pads 1202, 1204, 1206, 1208 define an anti-rotation cavity 1212 (not labeled with respect to the shroud pads 1202, 1204, 1206) to receive the anti-rotation tab 1210. For example, the anti-rotation cavity 1212 of the first shroud pad 1202 receives the anti-rotation tab 1210 of the second shroud pad 1204, the anti-rotation cavity 1212 of the second shroud pad 1204 receives the anti-rotation tab 1210 of the third shroud pad 1206, etc. The anti-rotation tabs 1210 prevent and/or reduce rotation of the shroud pads 1202, 1204, 1206, 1208 about the yaw axis (e.g., into and out of the plane of FIG. 12).

Figure 13:
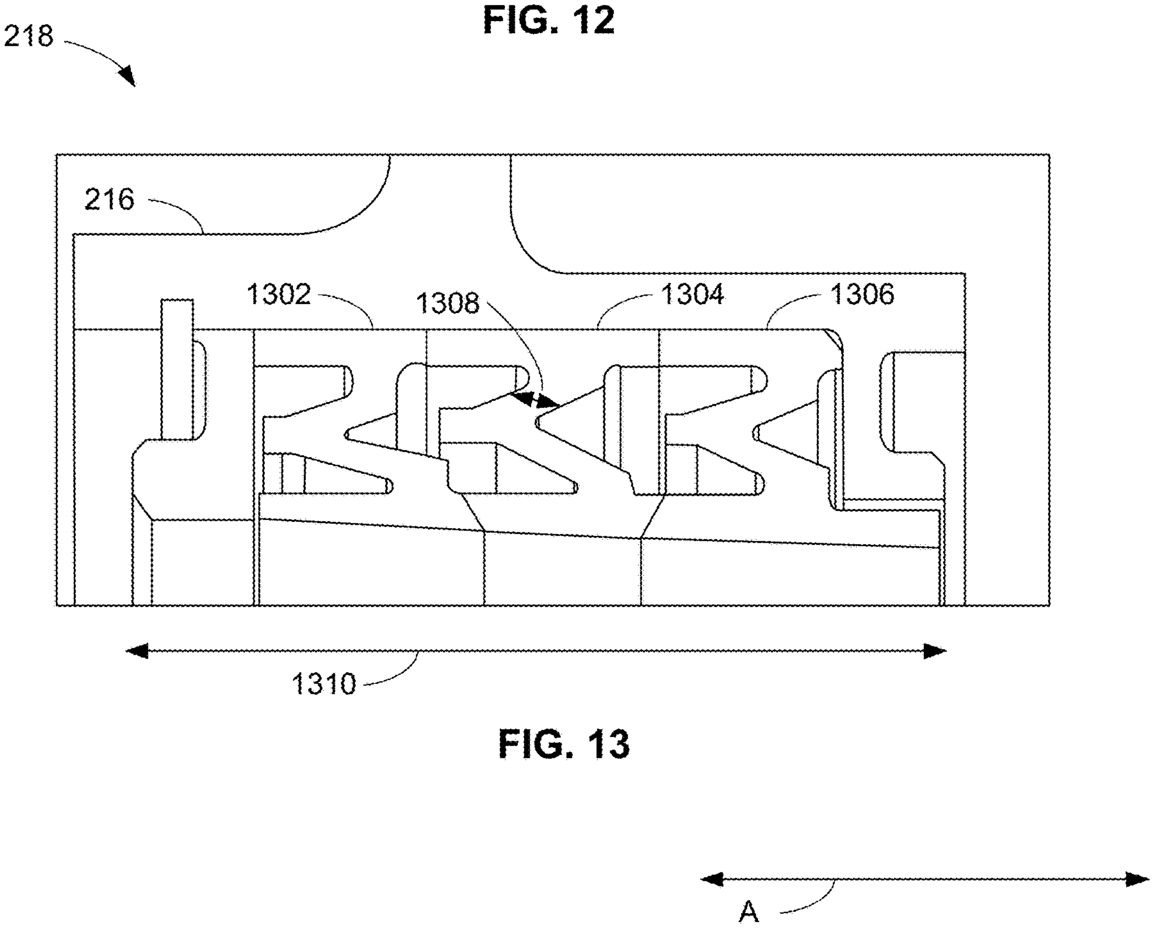
FIG. 13 illustrates an example bottom perspective view of the shroud assemblies of FIGS. 2-9.

FIG. 13 illustrates an example bottom perspective view of the shroud assembly 218 of FIGS. 2-9. For example, the shroud assembly 218 includes a first shroud segment 1302, a second shroud segment 1304, and a third shroud segment 1306. The shroud segments 1302, 1304, 1306 are coupled to the compressor casing 216 (FIG. 2). In FIG. 13, the shroud segments 1302, 1304, 1306 have a thickness 1308 (not labeled with respect to the shroud segments 1302, 1306). The thickness 1308 of the shroud segments 1302, 1304, 1306 can be 40-70 millimeters corresponding to a radial stiffness of $1\times10^5$–$5\times10^5$ pounds of force (lbf) per inch. However, in some examples, the thickness 1308 can be greater or less than 40-70 millimeters. In some examples, the shroud segments 1302, 1304, 1306 have the same thickness 1308. Additionally or alternatively, the shroud segments 1302, 1304, 1306 have different thicknesses 1308. For example, the first shroud segment 1302 and the third shroud segment 1306 have a thickness of 40 millimeters, and the second shroud segment 1304 has a thickness of 70 millimeters. The shroud assembly 218 of FIG. 13 has an axial width 1310. The axial width 1310 can be 20.32-25.4 millimeters. However, the axial width 1310 can be greater or less than 20.32-24.5 millimeters.

Figure 14B:
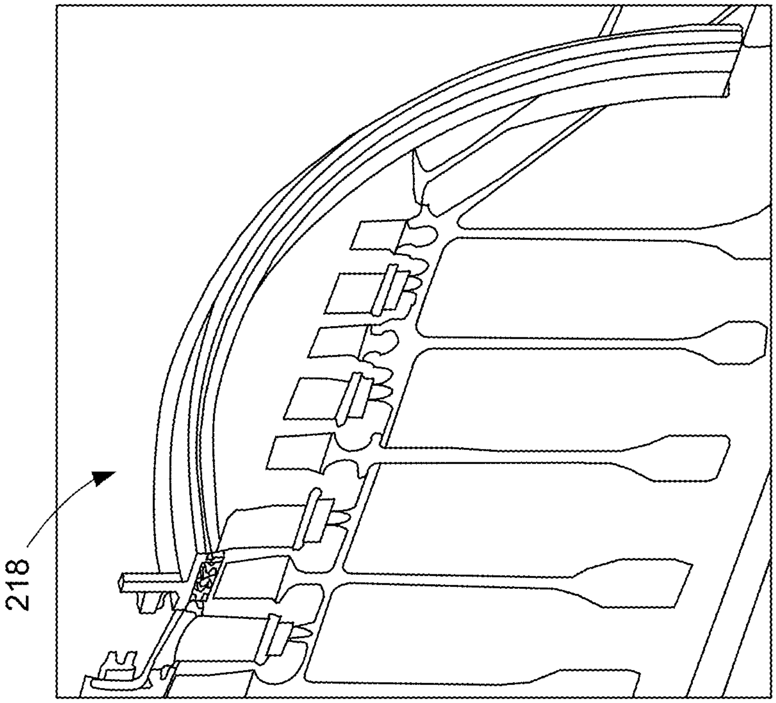
FIGS. 14A-14B illustrate example perspective views of the shroud assemblies of FIGS. 2-9.
Figure 14A:
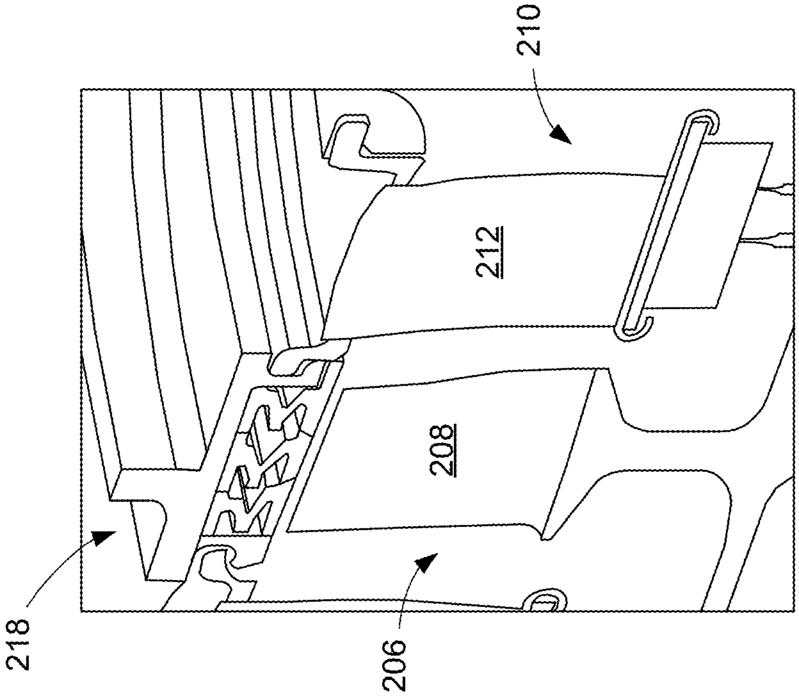

FIG. 14A illustrates an example perspective view of the shroud assembly 218 of FIGS. 2-9. For example, the shroud assembly 218 can be implemented by the shroud assembly 400 (FIG. 4), the shroud assembly 500 (FIG. 5), the shroud assembly 600 (FIG. 6), the shroud assembly 700 (FIG. 7), the shroud assembly 800 (FIG. 8), the shroud assembly 900 (FIG. 9), etc. The illustrated example of FIG. 14A includes the rows 206 of the rotor blades 208 and the rows 210 of the stator vanes 212. The shroud assembly 218 of FIG. 14A includes three shroud segments. However, the shroud assembly 218 of FIG. 14A can include a fewer or greater number of shroud segments.

FIG. 14B illustrates an example perspective view of the shroud assembly 218 of FIGS. 2-9. In some examples, the shroud assembly 218 of FIG. 14B is a cross-sectional view of a continuous shroud assembly (e.g., the circumferential shroud segments 1000 of FIG. 10). In some examples, the shroud assembly 218 of FIG. 14B is a circumferentially segmented shroud segment. For example, the shroud assembly 218 can be implemented by the circumferential shroud segments 1004, 1006, 1008, 1010 (FIG. 10). For example, the shroud assembly 218 can be a 30 degree sector with a 700 lbf radial load. In some examples, the stiffness of the shroud assembly 218 is approximately $1.4\times10^5$ lbf per inch.

Figure 15:
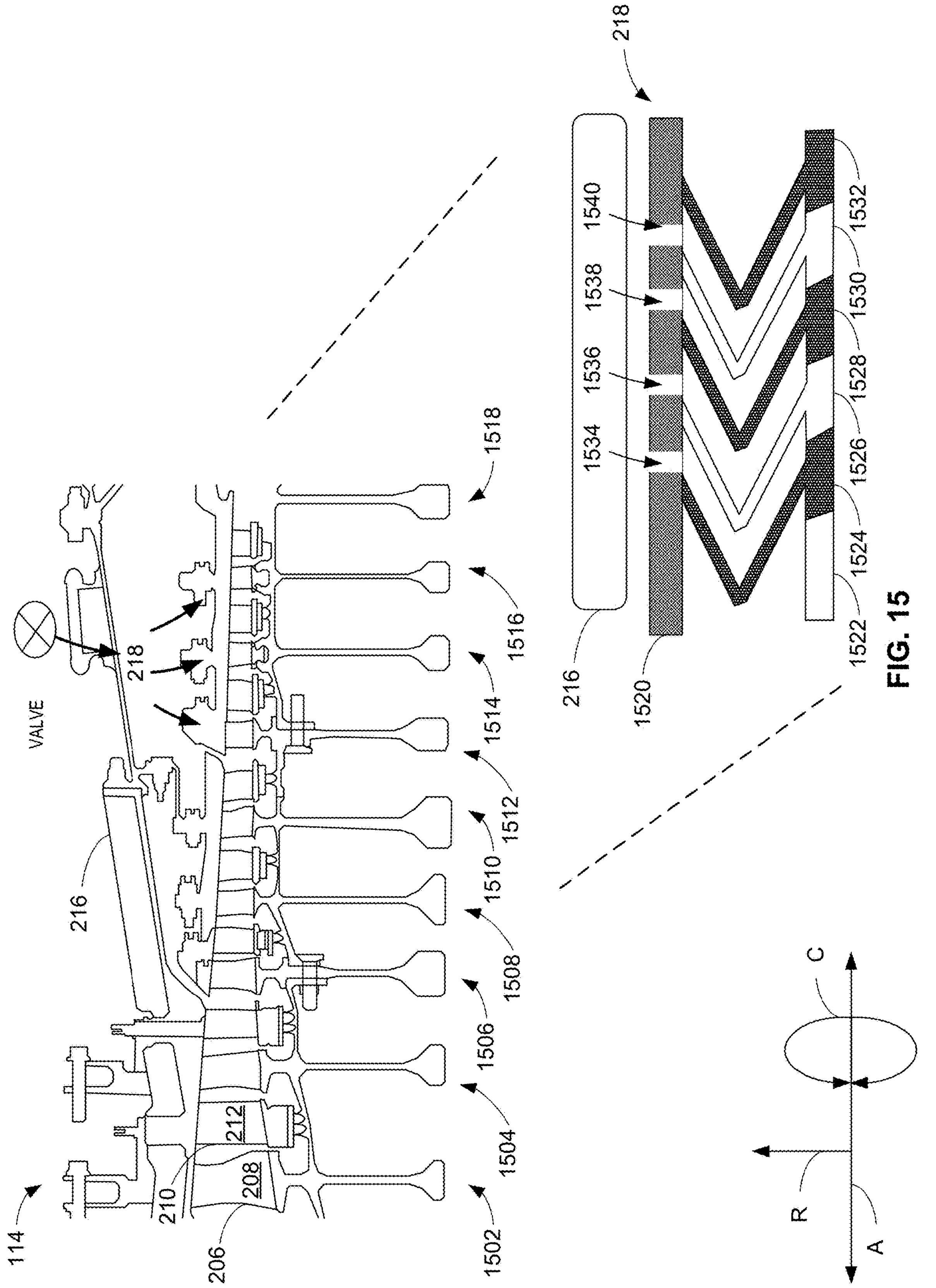
FIG. 15 illustrates an example cross-sectional side view of the HP compressor 114 of FIG. 2.

FIG. 15 illustrates an example cross-sectional side view of the HP compressor 114 of FIG. 2. The HP compressor 114 of FIG. 15 includes a first stage 1502, a second stage 1504, a third stage 1506, a fourth stage 1508, a fifth stage 1510, a sixth stage 1512, a seventh stage 1514, an eighth stage 1516, and a ninth stage 1518. However, the HP compressor 114 of FIG. 15 can include a greater or fewer number of stages. The stages 1502, 1504, 1506, 1508, 1510, 1512, 1514, 1516, 1518 can correspond to the stages 202, 204 of FIG. 2. That is, the stages 1502, 1504, 1506, 1508, 1510, 1512, 1514, 1516, 1518 can include the first row 206 of the rotor blades 208 and the second row 210 of the compressor stator vanes 212 (not labeled with respect to the stages 1504, 1506, 1508, 1510, 1512, 1514, 1516, 1518). The HP compressor 114 includes the shroud assembly 218 (FIG. 2) coupled to the compressor casing 216 (FIG. 2). For example, the shroud assembly 218 corresponds to the first row 206 of the rotor blades 208 of the stages 1502, 1504, 1506, 1508, 1510, 1512, 1514, 1516, 1518.

In FIG. 15, the shroud assembly 218 enables active/passive control to the HP compressor 114. The shroud assembly 218 includes an outer wall 1520, a first shroud segment 1522, a second shroud segment 1524, a third shroud segment 1526, a fourth shroud segment 1528, a fifth shroud segment 1530, and a sixth shroud segment 1532. The shroud segments 1522, 1524, 1526, 1528, 1530, 1532 include a shroud arm and shroud pad. The outer wall 1520 forms first air-damping holes 1534, second air-damping holes 1536, third air-damping holes 1538, and fourth air-damping holes 1540. In some examples, the shroud arms of the shroud segments 1522, 1524, 1526, 1528, 1530, 1532 define air-damping holes (e.g., the air-damping holes 512 of FIG. 5). In some examples, the shroud pads of the shroud segments 1522, 1524, 1526, 1528, 1530, 1532 form air-damping holes (e.g., the air-damping holes 514 of FIG. 5).

During cold assembly, the shroud assembly 218 can be assembled with a larger clearance gap to avoid and/or reduce rub between the shroud assembly 218 and the row 206 of the rotor blades 208 at steady state take off (SSTO). During SSTO, the clearance gap closes and/or reduces in size with few and/or no rubs. During cruise, the manifold may open to pressurize the cavity via the air-damping holes 1534, 1536, 1538, 1540. That is, in response to the increase in pressure, the shroud assembly 218 is deflected radially inward. Thus, the shroud assembly 218 and the rotor blades 208 run line to line at cruise.

The shroud assembly 218, the shroud assembly 400, the shroud assembly 500, the shroud assembly 600, the shroud assembly 700, the shroud assembly 800, and/or the shroud assembly 900 can be combined, divided, re-arranged, etc. For example, the outer wall of the shroud assemblies 218, 500, 600, 700, 800, 900 can be segmented and/or include anti-rotation tabs (e.g., the outer wall segment 420 of FIG. 4). Additionally or alternatively, the shroud pads of the shroud assemblies 218, 400, 500, 600, 700, 800, 900 can be at different radial positions (e.g., the positions 960, 962 of FIGS. 9A-9B).

The shroud assembly 218, the shroud assembly 400, the shroud assembly 500, the shroud assembly 600, the shroud assembly 700, the shroud assembly 800, and/or the shroud assembly 900 can prevent and/or reduce shroud and/or airfoil degradation during normal engine operation. At least the shroud arms 306, 404, 504, 604, 704, 804, 904 can be used to implement a means for reducing blade damage. For example, in FIG. 6, the first shroud arm 606 can implement a first means for reducing blade damage, the second shroud arm 608 can implement a second means for reducing blade damage, the third shroud arm 610 can implement a third means for reducing blade damage, etc. The reduction/prevention of shroud and/or airfoil degradation increases the reliability and durability of the rotor blades 208. The improved reliability/durability of the rotor blades 208 reduces repair/maintenance costs of the turbofan 100. Additionally or alternatively, the shroud assembly 218, the shroud assembly 400, the shroud assembly 500, the shroud assembly 600, the shroud assembly 700, the shroud assembly 800, and/or the shroud assembly 900 can improve the specific fuel consumption (SFC) due to a reduced clearance gap.

In operation, the shroud assembly (e.g., the shroud assembly 218, the shroud assembly 400, the shroud assembly 500, the shroud assembly 600, the shroud assembly 700, the shroud assembly 800, and/or the shroud assembly 900, etc.) of the HP compressor 114 moves radially outwardly upon contact with one or more of the rotor blades 208. This radial movement prevents erosion of the shroud and/or the rotor blades 208. That is, the examples disclosed herein increase reliability/durability of gas turbine engines by decreasing rubbing between the shroud and the rotor blades.

The following claims are hereby incorporated into this Detailed Description by this reference, with each claim standing on its own as a separate embodiment of the present disclosure.

Further aspects of the present disclosure are provided by the subject matter of the following clauses:

Example 1 is a shroud assembly for a gas turbine engine, the shroud assembly comprising: a first shroud arm having a first end and a second end, the first end to couple an outer wall and the second end to couple to a first shroud pad; and a second shroud arm having a first end and a second end, the first end to couple to the outer wall and the second end to couple to a second shroud pad, at least one of the first shroud pad or the second shroud pad to move radially outward toward the outer wall in response to a rotor blade contacting the at least one of the first shroud pad or the second shroud pad.

Example 2 is the shroud assembly of any preceding clause, wherein the first shroud arm and the second shroud arm have a hairpin structure.

Example 3 is the shroud assembly of any preceding clause, wherein the first shroud pad and the second shroud pad have an air-damping hole.

Example 4 is the shroud assembly of any preceding clause, wherein the first shroud arm has an air-damping hole.

Example 5 is the shroud assembly of any preceding clause, wherein the outer wall has an air-damping hole.

Example 6 is the shroud assembly of any preceding clause, wherein the first shroud arm has a first stiffness and the second shroud arm has a second stiffness.

Example 7 is the shroud assembly of any preceding clause, wherein the first stiffness is less than the second stiffness, the first shroud pad is at a first position and the second shroud pad is at a second position.

Example 8 is the shroud assembly of any preceding clause, wherein the first position is at a lower radial position than the second position.

Example 9 is the shroud assembly of any preceding clause, wherein the first shroud pad is to move radially outward to the second position in response to the rotor blade contacting the first shroud pad.

Example 10 is the shroud assembly of any preceding clause, wherein at least one of the first shroud pad or the second shroud pad is coated.

Example 11 is the shroud assembly of any preceding clause, wherein the first shroud pad and the second shroud pad are to include an anti-rotation tab.

Example 12 is the shroud assembly of any preceding clause, wherein the outer wall is to include a first outer wall segment and a second outer wall segment, the first end of the first arm to couple to the first outer wall segment and the first end of the second arm to couple to the second outer wall segment.

Example 13 is the shroud assembly of any preceding clause, wherein the first outer wall segment and the second outer wall segment are to include an anti-rotation tab and an anti-rotation cavity.

Example 14 is the shroud assembly of any preceding clause, wherein the anti-rotation cavity of the first outer wall segment is to receive the anti-rotation tab of the second outer wall segment.

Example 15 is the shroud assembly of any preceding clause, wherein the first shroud arm and the second shroud arm are 360 degree axial segments.

Example 16 is the shroud assembly of any preceding clause, wherein the first shroud arm and the second shroud arm are circumferentially segmented.

Example 17 is the shroud assembly of any preceding clause, wherein the first shroud pad and the second shroud pad are to form a split line, the split line parallel to the radial axis.

Example 18 is the shroud assembly of any preceding clause, wherein the first shroud pad and the second shroud pad are to form a split line, the split line not parallel to the radial axis.

Example 19 is the shroud assembly of any preceding clause, wherein the first shroud pad is to include a shroud pad base and a shroud pad tip, the second end of the first arm to couple to the shroud pad base.

Example 20 is the shroud assembly of any preceding clause, wherein the shroud pad base has a smaller axial length than the shroud pad tip of the first shroud pad.

Example 21 is the shroud assembly of any preceding clause, wherein the second shroud pad is to include a shroud pad base and a shroud pad tip, the second end of the second arm to couple to the shroud pad base.

Example 22 is the shroud assembly of any preceding clause, wherein the shroud pad base has a greater axial length than the shroud pad tip of the second shroud pad.

Example 23 is the shroud assembly of any preceding clause, wherein the first shroud pad is to include a first shroud pad segment and a second shroud pad segment.

Example 24 is the shroud assembly of any preceding clause, wherein the first shroud pad segment and the second shroud pad segment are to form a split line, the split line parallel to an axial centerline of the gas turbine engine.

Example 25 is the shroud assembly of any preceding clause, wherein the split line is a first split line and the second shroud pad is to include a third shroud pad segment and a fourth shroud pad segment, the third shroud pad segment and the fourth shroud pad segment to form a second split line.

Example 26 is the shroud assembly of any preceding clause, wherein the second split line is not parallel to the axial centerline of the gas turbine engine.

Example 27 is the shroud assembly of any preceding clause, wherein the first split line and the second split line are aligned.

Example 28 is the shroud assembly of any preceding clause, wherein the first split line and the second split line are offset.

Example 29 is a gas turbine engine, comprising: a compressor including a compressor casing and at least one compressor blade; a combustion section; a turbine including a turbine casing and at least one turbine blade; a shaft to rotatably couple the compressor and the turbine; and a shroud assembly for at least one of the compressor or the turbine, the shroud assembly including: a first shroud arm having a first end and a second end, the first end to couple to an outer wall and the second end to couple to a first shroud pad; and a second shroud arm having a first end and a second end, the first end to couple to the outer wall and the second end to couple to a second shroud pad, at least one of the first shroud pad or the second shroud pad to move radially outward toward the outer wall in response to a rotor blade contacting the at least one of the first shroud pad or the second shroud pad.

Example 30 is the gas turbine engine of any preceding clause, wherein the first shroud pad is at a first position and the second shroud pad is at a second position, the first position at a lower radial position than the second position.

Example 31 is the gas turbine engine of any preceding clause, wherein the first shroud pad is to move radially outward to the second position in response to the rotor blade contacting the first shroud pad.

Example 32 is a shroud apparatus comprising: first means for reducing blade damage having a first end and a second end, the first end to couple to an outer wall of the shroud assembly and the second end to couple to a first shroud pad; and second means for reducing blade damage having a first end and a second end, the first end to couple to the outer wall and the second end to couple to a second shroud pad, at least one of the first shroud pad or the second shroud pad to move radially outward toward the outer wall in response to a rotor blade contacting the at least one of the first shroud pad or the second shroud pad.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A shroud assembly for a gas turbine engine, the shroud assembly comprising:
- a first shroud pad;
- a second shroud pad forming a split line with the first shroud pad, the split line unaligned with a radial axis of the gas turbine engine;
  - a third shroud pad, the second shroud pad axially between the first shroud pad and the third shroud pad;
  - an outer wall radially outboard of the first shroud pad and the second shroud pad;
  - a first shroud arm extending between the first shroud pad and the outer wall; and
  - a second shroud arm extending between the second shroud pad and the outer wall.

2. The shroud assembly of claim 1, wherein the split line is a first split line and the third shroud pad forms a second split line with the second shroud pad, the second split line unaligned with the radial axis.

3. The shroud assembly of claim 2, wherein the first split line and the second split line are parallel.

4. The shroud assembly of claim 1, wherein the first shroud pad and the second shroud pad have a same shape.

5. The shroud assembly of claim 1, wherein the first shroud pad and the second shroud pad are interlocking.

6. The shroud assembly of claim 5, wherein the split line includes at least two non-parallel linear segments.

7. The shroud assembly of claim 5, wherein the first shroud pad includes a first tip and the second shroud pad includes a second tip, the first tip radially spaced from the second tip.

8. The shroud assembly of claim 1, wherein the first shroud arm has a first stiffness and the second shroud arm has a second stiffness different than the first stiffness.

9. The shroud assembly of claim 8, further including:
- a fourth shroud pad, the third shroud pad axially between the fourth shroud pad and the second shroud pad;
- a third shroud arm extending between the third shroud pad and the outer wall, the third shroud pad having the first stiffness; and
- a fourth shroud arm extending between the fourth shroud pad and the outer wall, the fourth shroud pad having the second stiffness.

10. A gas turbine engine having a radial axis, the gas turbine engine comprising:
- a compressor;
- a turbine; and
- a shroud assembly for at least one of the compressor or the turbine, the shroud assembly including:
  - an outer wall;
  - a first shroud pad;
  - a second shroud pad forming a split line with the first shroud pad, the split line unaligned with the radial axis of the gas turbine engine;
  - a third shroud pad, the second shroud pad axially between the first shroud pad and the third shroud pad;
  - a first shroud arm including:
    - a first end coupled to the outer wall; and
    - a second end coupled to the first shroud pad; and
  - a second shroud arm including:
    - a third end coupled to the outer wall; and
    - a fourth end coupled to the second shroud pad.

11. The gas turbine engine of claim 10, wherein the split line is a first split line and the third shroud pad forms a second split line with the second shroud pad, the second split line unaligned with the radial axis.

12. The gas turbine engine of claim 11, wherein the first split line and the second split line are non-parallel.

13. The gas turbine engine of claim 10, wherein the first shroud pad has a first shape and the second shroud pad has a second shape different than the first shape.

14. The gas turbine engine of claim 10, wherein the first shroud arm has a first stiffness and the second shroud arm has a second stiffness different than the first stiffness.

15. The shroud assembly of claim 14, wherein the first shroud pad has the first stiffness and the second shroud pad has the second stiffness.

16. A shroud assembly for a gas turbine engine, the shroud assembly comprising:
- a first shroud segment including:
  - a first shroud pad;
  - a first shroud arm extending radially outboard from the first shroud pad;
  - a tab, the tab to extend parallel to axial axis of the gas turbine engine;
- a second shroud segment including:
  - a second shroud pad;
  - a second shroud arm extending radially outboard from the second shroud pad; and
  - a cavity receiving the tab.

17. The shroud assembly of claim 16, wherein the tab is a first tab, the cavity is a first cavity, the second shroud pad includes a second tab, and further including a third shroud segment includes a second cavity to receive the second tab.

18. The shroud assembly of claim 17, wherein the first tab and the second tab are axially aligned.

19. The shroud assembly of claim 16, wherein the tab extends from the first shroud pad and the second shroud pad includes the cavity.

20. The shroud assembly of claim 16, wherein the tab is rectangular.

* * * * *